US012388796B1

(12) United States Patent
     Crider et al.

(10) Patent No.: US 12,388,796 B1
(45) Date of Patent: Aug. 12, 2025

(54) SYSTEMS AND METHODS FOR AN AUTOMATED DATA BROKER

(71) Applicant: Amazon Technologies, Inc., Seattle, WA (US)

(72) Inventors: Anthony Crider, Broomfield, CO (US); Gour Kishore Saha, Fremont, CA (US); Rajagopal Sathyamurthi, Sunnyvale, CA (US); Anurag Singh, Mountain View, CA (US); Pranav Narasimmaraj, Pleasanton, CA (US)

(73) Assignee: Amazon Technologies, Inc., Seattle, WA (US)

( * ) Notice: Subject to any disclaimer, the term of this patent is extended or adjusted under 35 U.S.C. 154(b) by 241 days.

(21) Appl. No.: 18/065,815

(22) Filed: Dec. 14, 2022

(51) Int. Cl.
    *H04L 9/40* (2022.01)
(52) U.S. Cl.
    CPC .................. *H04L 63/0421* (2013.01)
(58) Field of Classification Search
    CPC ................................................ H04L 63/0421
    See application file for complete search history.

(56) References Cited

U.S. PATENT DOCUMENTS

| 11,516,218 | B2 * | 11/2022 | Bugenhagen | H04L 63/101 |
| 11,954,225 | B1 * | 4/2024 | Guenther | G06F 21/6245 |
| 2007/0083536 | A1 * | 4/2007 | Darnell | G06F 16/9535 |
| 2008/0103900 | A1 * | 5/2008 | Flake | G06Q 30/0277 |
| | | | | 705/14.52 |
| 2011/0040736 | A1 * | 2/2011 | Kalaboukis | H04L 67/10 |
| | | | | 707/E17.014 |
| 2011/0258049 | A1 * | 10/2011 | Ramer | G06Q 30/0273 |
| | | | | 705/14.69 |
| 2012/0072936 | A1 * | 3/2012 | Small | G06Q 30/00 |
| | | | | 725/10 |
| 2013/0160138 | A1 * | 6/2013 | Schultz | G06F 21/6254 |
| | | | | 726/27 |
| 2013/0179447 | A1 * | 7/2013 | Ajitomi | G06F 21/629 |
| | | | | 707/736 |
| 2015/0381607 | A1 * | 12/2015 | Patton | H04L 9/088 |
| | | | | 713/175 |
| 2016/0217461 | A1 * | 7/2016 | Gaddam | G06Q 20/383 |
| 2017/0132431 | A1 * | 5/2017 | Gonzalez Blanco | |
| | | | | H04L 63/0838 |
| 2018/0027006 | A1 * | 1/2018 | Zimmermann | H04L 63/0227 |
| | | | | 726/11 |
| 2019/0318122 | A1 * | 10/2019 | Hockey | G06Q 20/209 |
| 2019/0362101 | A1 * | 11/2019 | Fisse | H04L 67/306 |

(Continued)

*Primary Examiner* — Jason Chiang
(74) *Attorney, Agent, or Firm* — Eversheds Sutherland (US) LLP

(57) ABSTRACT

An automated data broker system is provided. The automated data broker system serves as an intermediary system between input user data including user interactions with various types of services (for example, a video streaming platform, online retail shopping platform, video game streaming platform, etc.). The automated data broker system receives the various input data and modifies, filters, or otherwise transforms the input data using one or more APIs to produce output data that may then be provided to downstream systems for use and storage. The output data may be standardized in a form that is suitable for use in accordance with various rules relating to user data. For example, the output data may be pseudonymized and input data associated with users who have "opted-out" of data collection may be filtered out.

16 Claims, 14 Drawing Sheets

(56) References Cited

U.S. PATENT DOCUMENTS

| | | | |
|---|---|---|---|
| 2020/0264940 A1* | 8/2020 | Guereca-Pinuelas | G06F 9/542 |
| 2020/0320207 A1* | 10/2020 | Beno | G06F 21/64 |
| 2021/0182915 A1* | 6/2021 | Blaikie, III | G06Q 20/145 |
| 2021/0226933 A1* | 7/2021 | Puzeris | H04L 63/0442 |
| 2021/0390196 A1* | 12/2021 | Lavine | H04L 63/102 |
| 2021/0401295 A1* | 12/2021 | Zhi | G06N 3/04 |
| 2021/0406402 A1* | 12/2021 | Seibel | G06Q 30/0201 |
| 2022/0036377 A1* | 2/2022 | Seibel | G06Q 30/08 |
| 2022/0198054 A1* | 6/2022 | Picos | G06N 5/04 |
| 2022/0318852 A1* | 10/2022 | Blaikie, III | G06Q 30/0255 |
| 2022/0386067 A1* | 12/2022 | Donaire | H04W 4/021 |
| 2023/0032863 A1* | 2/2023 | Bolser | G06F 21/604 |
| 2023/0161900 A1* | 5/2023 | Boutros | G06F 3/0482 726/27 |
| 2024/0054062 A1* | 2/2024 | Murphy | G06F 11/3051 |

* cited by examiner

SYSTEMS AND METHODS FOR AN AUTOMATED DATA BROKER

BACKGROUND

Users may interact with a number of different types of services. For example, interactions may include searches and product purchases made through an online retail shopping platform, music plays on a music platform, video views on a video streaming platform or a video game streaming platform, purchases through a website associated with a grocery store, etc. Data associated with such user actions may be used in association with certain advertisement functions, such as audience creation for display ads, personalization of sponsored ads, conversion tracking for attribution, etc.

As more customer-centric data is used for advertisement purposes, the effort from individual teams to ingest new data sources and perform data quality and compliance checks (e.g., pseudonymization, data provenance annotation, policy guardrails, etc.) has started to become a bottleneck. Additionally, a rapid evolution is occurring in the data privacy compliance space. Rules and regulations, such as, the General Data Protection Regulation (GDPR) and the California Consumer Privacy Act (CCPA), provide strict requirements for handling and storing user data. To account for such rules and regulations, any user data that is obtained may need to be analyzed and filtered to ensure that the user data is used in compliance with the rules and regulations. This process may often be performed manually and may lead to significant bottlenecks in the usage of the data, especially in scenarios where the data is used by multiple different downstream systems that may each need to ensure their individual compliance with the rules and regulations.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical, components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1A:
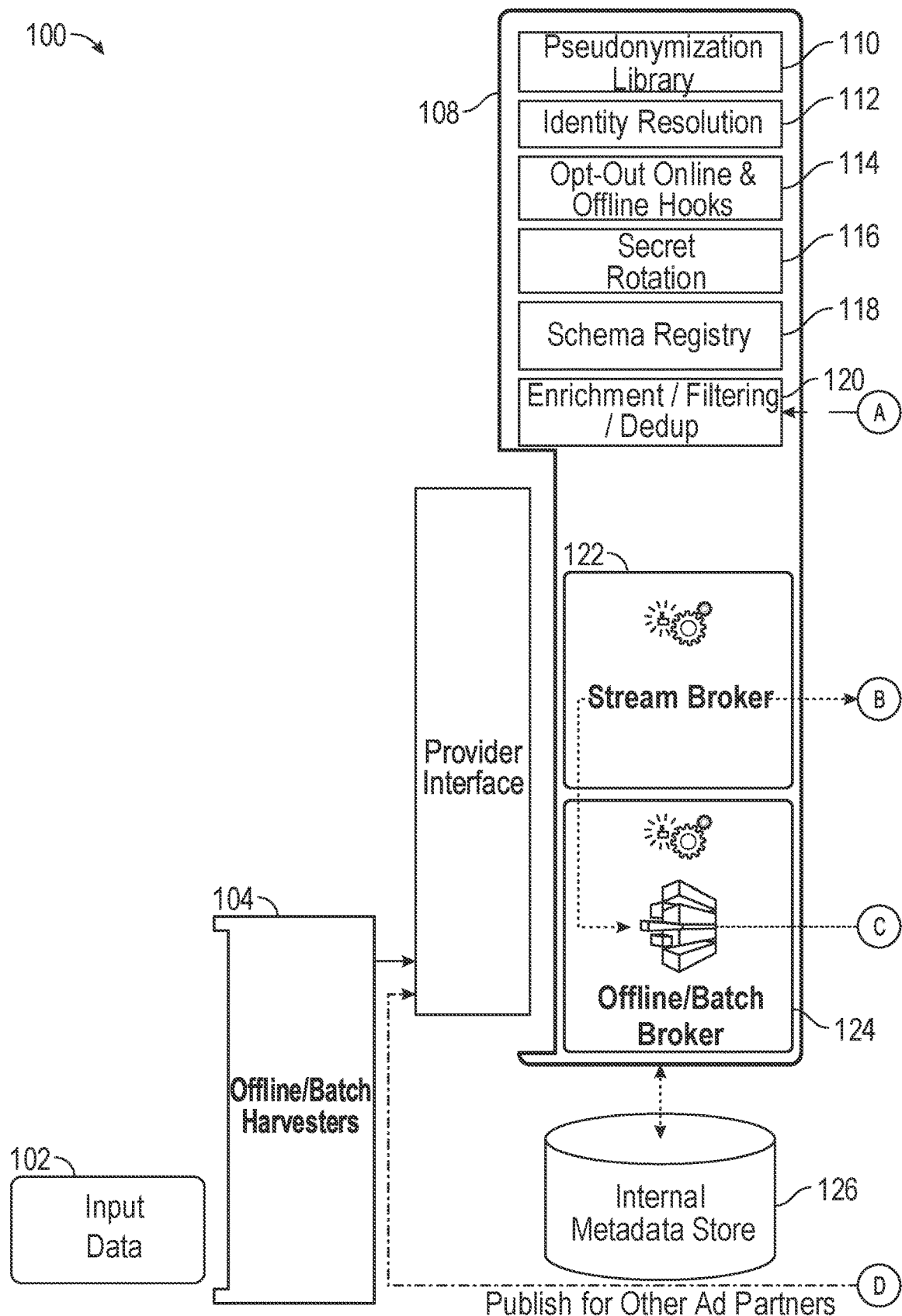
FIGS. 1A-1B illustrate an example system architecture in accordance with one or more example embodiments of the disclosure.

This disclosure relates to, among other things, devices, systems, methods, computer-readable media, techniques, and methodologies for an automated data broker. The automated data broker system may be a computing system that is provided as an intermediary between one or more data sources and one or more data consumers that use and/or store the data produced by the one or more data sources. The automated data broker system automatically processes input data received from the one or more data sources to produce output data that is suitable for storage and use by the one or more data consumers in accordance with various restrictions and rules associated with the data (for example, ensuring the data is in compliance with a data policy).

In one or more embodiments, the automated data broker system may be a system that unifies the ingestion and delivery of privacy-compliant and schematized customer event data from various different types of user services. As nonlimiting examples, the automated data broker system may ingest user data from an online retail shopping platform, online grocery store purchases, online video streaming and video game streaming services, and/or any other types of services with which a user may interact. This data may be useful for use in several advertising functions such as audience creation for display advertisements, personalization of sponsored advertisements, conversion tracking for attribution, etc. The automated data broker system handles security compliances (e.g., encryption on transit and at rest) and data privacy and regulatory compliances (e.g., the General Data Protection Regulation (GDPR), California Consumer Privacy Act (CCPA), etc.) for brokered customer events.

The use of the automated data broker system is especially beneficial given the scope of the data that is being ingested and the potential number of downstream consumer systems that store and use the data. As an example, in some cases, over 70 unique downstream systems may leverage customer data ingested from the one or more data sources. This input data may be ingested via 15 or more integrations spread across audiences, sponsored ads, and attributions; many of them ingesting the same types of signals. These numbers may also be significantly higher. The scope of the downstream systems using the input data illustrates the inconsistencies and processing inefficiencies that may arise if each of the downstream systems perform their own processing of the input data to ensure compliance as described above. Additionally, multiple systems harvesting the same events from varied nonauthoritative upstream sources, enriching via potentially stale data and applying nonconforming privacy and regulatory compliances creates disparate views of the same customer action. The automated data broker system may mitigate or eliminate some of these issues associated with relying on individual downstream consumer systems to individually process the input data.

The automated data broker system is configured such that the infrastructure for cross-cutting functions may serve as a core platform layer. The automated data broker system provides APIs and tools to apply security for data-at-rest and data-in-motion, privacy compliance (for example, opt-out and teen-data filtering), and/or regulatory compliance (for example, data-deletion) in a unified fashion to all cells. Any input data (for example, user events) associated with a given service may be designed as a cell in this cell-based architecture. Multiple user events across all different services may serve as multiple cells. All these cells may comply with privacy and regulatory policies in a unified fashion managed by the core platform. Updates to existing policies and adoption of new policies in the platform layer may be applied across all cells with no overhead of individually attending to each and every cell. This cell-based architecture allows data governance of privacy-sensitive data via centralized controls like permissions management, auditing, data capture, etc.

In one or more embodiments, each cell may bring a unique set of user events from a specific service with which a user interacts into an advertisement service. This avoids duplication of data, provides consistent data across all channels, and promotes multi-use. User events from each cell may be provided to multiple downstream advertisement use cases via multiple channels such as APIs, streams, messages, and offline datasets.

Figure 1B:
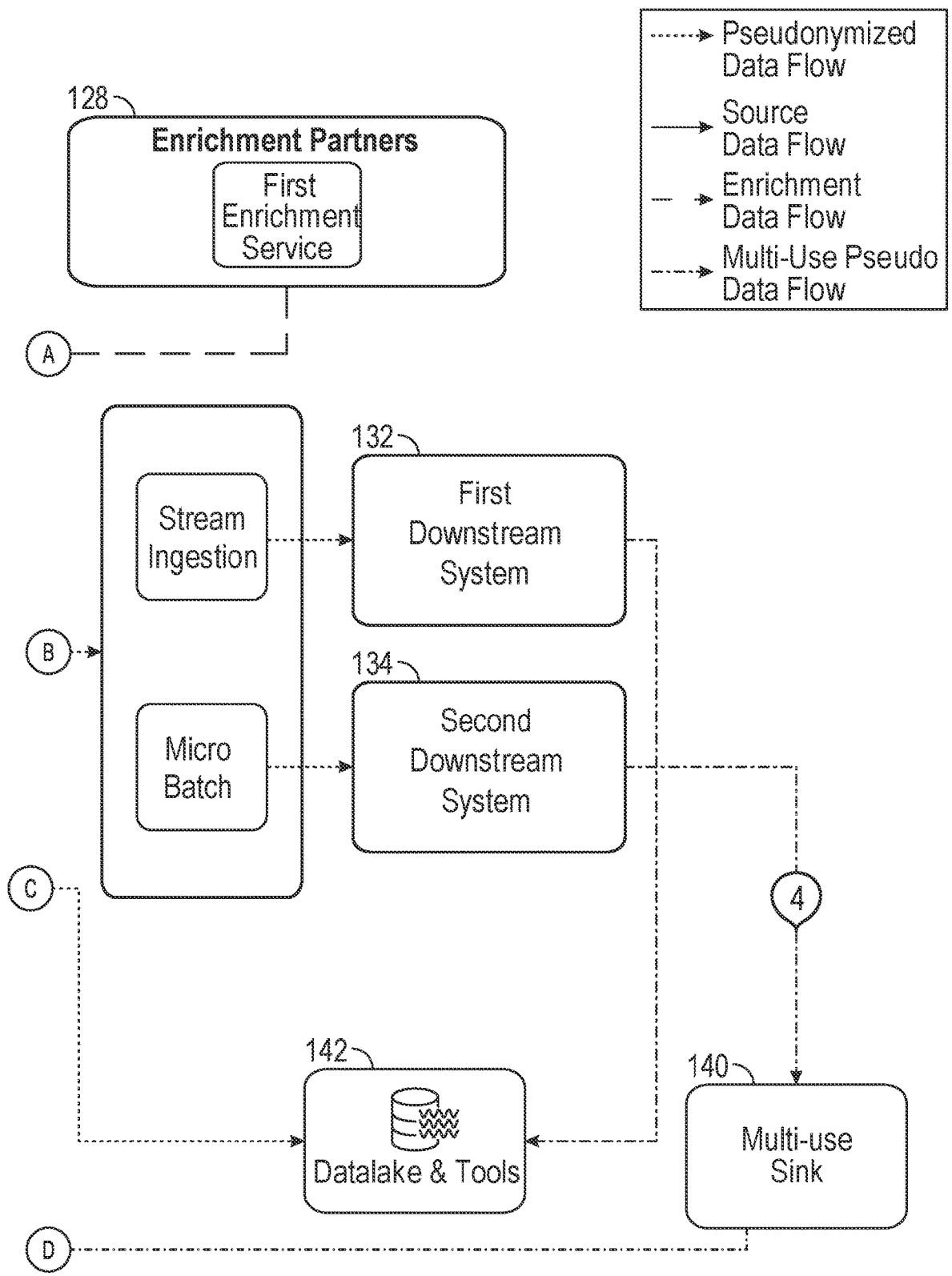

Turning to the figures, FIGS. 1A-1B illustrate an example system architecture 100 in accordance with one or more example embodiments of the disclosure. Particularly, the system architecture 100 illustrates an example automated data broker system 108.

The automated data broker system 108 may be configured to receive various types of input data 102. In one or more embodiments, the input data 102 may be raw data that is received from any number of different sources. That is, the input data may be received in a non-standardized format that may, in some instances, not yet be in compliance with one or more user data rules. Consequentially, some or all of the input data 102 may need to be modified, removed (e.g., filtered out), and/or otherwise transformed before the input data 102 may be stored and/or used by any downstream services (e.g., advertisement services, etc.). For example, the input data 102 may include personally identifiable information (PII) and/or information that is associated with a user who has indicated an "opt-out" from user data collection. These types of data (which are merely exemplary) may not be suitable for storage and/or use in some instances and thus may need to be modified, removed (e.g., filtered out), and/or otherwise transformed using the automated data broker system 108 that is provided as an intermediary system between the data harvester 104 (described below) and any downstream systems that use the input data 102.

The input data 102 associated with various types of different services (for example, a video streaming platform, a video game streaming platform, an online retail shop, and/or any other type of service). The users may interact with such services and data relating to the interactions (as well as various other types of data) may be captured and provided as input data 102 to the automated data broker system 108. As one nonlimiting example, a user may interact with a video game streaming platform to view live streaming content being produced by content creators. In this example, the input data 102 may include data such as categories of video games viewed by the user, specific content creators viewed by the user, an amount of time spent viewing content on the platform, and/or any other types of data. As another example, a user may purchase an item through an online website associated with a grocery store. The input data 102 in this example may include a price of the purchased item, a category of item, etc.

The input data 102 may be obtained by a data harvester 104. In one or more embodiments, the data harvester 104 may include one or more tools that may be used to obtain the input data 102 from various data sources. For example, the one or more tools may include the capability to establish structured query language (SQL) commands. SQL is the standard language for relational database management systems. SQL statements are used to perform tasks such as updating data in a database or retrieving data from the database. The SQL commands may be configured such that data may be obtained from any data sources at a regular cadence. For example, the data harvester 104 may be configured to automatically retrieve the input data 102 in hourly intervals, daily intervals, and/or any other time interval. The data harvester 104 may also be configured to obtain the input data 102 in real-time or near real-time as the input data 102 is produced by the one or more data sources. The cadence at which the input data 102 is obtained by the data harvester may also be manually updated by a user or automatically updated by the system. The data harvester 104 may also be configured to obtain the input data 102 using any other methods beyond the use of SQL commands as well. For example, the data harvester may include REST hooks to consume data from REST data providers, custom Java/Perl clients for intrusive integration with upstream code, etc.

The data harvester 104 may provide the input data 102 to the automated data broker system 108. The data harvester 104 may be configured to provide the input data 102 to the automated data broker system 108 in various formats. For example, the data may be provided within a bucket associated with an object storage service. An object may be a file and any metadata that describes the file. A bucket may be a container for objects. To store data using the object storage service, a bucket and bucket name may be generated. Subsequently, data may be provided to that bucket as objects. Each object may have a key (or key name), which is the unique identifier for the object within the bucket. As another example, the data may be streamed to the automated data broker system 108. For example, a serverless streaming data service that allows for real-time rapid and continuous data intake and aggregation.

The automated data broker system 108 may be a real-time processing system that ensures that data is appropriately pseudonymized (or fully anonymized), filtered, modified, and/or otherwise transformed for storage and use by any downstream systems. Thus, the automated data broker system 108 ensures that user data is stored and/or used in accordance with various user data rules depending on the type of user data that is obtained.

The automated data broker system 108 may be configured to modify, filter, and/or otherwise transform data from any number of different types of services from which user data may be obtained. For example, the automated data broker system 108 may receive data relating to online purchases from a grocery store may be a user, indications of movies viewed and/or purchased by a user through a video streaming platform, content creators viewed by a user through a video game streaming platform, product views and/or purchases made by a user through an online retail shopping platform, and/or any other different types of user data that may be generated by a user interacting with any number of different types of unique services. Thus, rather than requiring input data associated with different services and different downstream systems that use the data (for example, for advertising purposes), the automated data broker system 108 provides an automated and centralized system that ensures that output data is in a format that is suitable for storage and consumption, regardless of the type of data, the source of data, and/or the manner in which the downstream system that is consuming and/or storing the data.

In one or more embodiments, the automated data broker system 108 may include a stream broker module 122 and an offline/batch broker module 124 (further embodiments of the automated data broker system may include additional modules, as is shown in FIG. 2). The stream broker module 122 may be a module that facilitates the transformation of the input data 102 into a final format that is suitable for storage and/or use. To facilitate the transformation, the stream broker module 122 may be configured to call various different application programming interfaces (APIs). In one or more embodiments, the APIs may include a combination of internal and external services (however, the APIs may similarly include only internal or only external services). More detailed illustrations of the stream broker module 122 may be provided with respect to FIGS. 3A-3C.

In one or more embodiments, the APIs may include at least a pseudonymization library API 110, an identity resolution API 112, an opt-out online and offline hooks API 114, a secret rotation API 116, a schema registry API 118, and an enrichment, filtering, and deduplication APIs 120. The one or more APIs may also include any other combination of different APIs associated with various different services.

The pseudonymization library API 110 and secret rotation API 116 may be responsible for data pseudonymization (or full anonymization) of the input data 102. As one nonlimiting example, the pseudonymization library API 110 and secret rotation API 116 may be used to anonymize any user PII associated with the input data 102. The pseudonymization library API 100 may receive an input key and encrypt the input key using an encryption algorithm associated with a specific salt. A salt is random data that is used as an additional input to a one-way function that hashes data. Specifically, the salt may be an additional key that is provided to the encryption algorithm that encrypts the initial key. To further increase the effectiveness of the encryption of the initial key, the secret rotation API 118 automatically modifies the salt periodically. The salt may be adjusted at various intervals so that the same salt is not used for a long period of time. For example, a new salt may be generated every few minutes, every hour, and/or at any other periodic or random time interval.

The identity resolution API 112 maps a user identity in a particular system (for example, the video game streaming platform) to the identity of the same user in the online retail shopping platform. There are instances where different platforms may use the same authentication/identity service behind the scene and hence the same credentials (for example, username and password) to access the different services. However, there are instances where certain subsidiaries use different identity platforms and hence different credentials from that used to access the online retail shopping platform. The identity resolution API 112 is responsible for mapping the same user with two separate credentials for the two separate platforms.

The opt-out online and offline hooks APIs 114 may be the APIs that access the database 126 to determine if a user has opted out of data collection. If the user has opted out, then some or all of the input data 102 associated with the user is filtered out and not output by the automated data broker system 108 to the downstream systems and/or the database 142.

The schema registry API 118 ensures that any data provided to the automated data broker system 108 is provided a formal schema. A database schema represents a logical configuration of all or part of a relational database. The schema can exist both as a visual representation and as a set of formulas known as integrity constraints that govern a database. These formulas may be expressed in a data definition language, such as SQL. In some cases, the schema registry API 118 may define the schema through OpenAPI or the swagger specification. This allows any downstream systems not using Java to create cells using any other types of programming languages (e.g., Python cells, smart SQL cells, etc.).

With respect to the enrichment, filtering, and deduplication APIs 120, enrichment may be a service that "enriches" input data with additional information. For example, if a user is viewing a movie on a video streaming platform, when the user pauses the movie, information about the movie may be provided by a catalog decoration service 128 to enrich the input data relating to the movie (for example, the additional information may include the title of the movie, the genre, etc.). This is merely one example of data enrichment and enrichment may similarly involve adding any other types of information to input data for any other services with which a user may interact.

The filtering API may also be responsible for removing certain types of data from the input data 102 based on particular rules. For example, one rule may indicate that user data should be filtered out for any users determined to be of an age that is below a threshold age. As aforementioned, some or all of these rules may be stored within the database 126.

Deduplication processes a sequence of data to determine which portions of the data may be propagated and which portions may be dropped. For example, as aforementioned, when a user pauses a video within a video streaming platform, certain information about the video may be provided to the automated data broker system 108 as part of the data enrichment process. However, if a user were to pause and restart the video several times within a short time frame, then the data that is provided after the first pause event may not necessarily be valuable given the initial data that was also provided. Thus, the deduplication API may remove this invaluable data to reduce the amount of data that is provided to the downstream systems and/or the database 142.

The output of the automated data broker system 108 from the stream broker module 122 may be provided to any number of different downstream systems (for example, FIG. 1 shows the stream broker module 122 outputting data to a first downstream system 132 and a second downstream system 134; however, any other number of downstream systems may also be provided to receive output data from the automated data broker system 108). For example, the first downstream system 132 and/or second downstream system 134 may be systems that analyze the input data 102 to produce metrics and other insights for advertisement purposes. Additionally, in addition to the input data 102 being ingested by the automated data broker system 108 in various formats, the output data may also be provided to the downstream systems in various formats as well. For example, the output data may also be provided with a bucket associated with an object storage service or may be streamed to the downstream system. The output data may also be provided to a downstream system in any other suitable manner.

The offline/batch broker 124 is another module that is provided within the automated data broker system 108 that may be used to send any of the output data produced by the automated data broker system 108 for storage in a database 142. That is, rather than providing the output data directly to the downstream systems for immediate use, any of the output data may be provided to the database 142 for storage and subsequent use (however, the data may still be provided to the downstream systems and then subsequently provided to the database 142 from the downstream systems). Although FIG. 1 only shows one particular database 142 associated with the first downstream system, any of the other downstream systems may also store data in any number of other databases as well. In some instances, each individual downstream system may have its own unique database for data storage. The database 142 may also be configured to automatically manage the data based on one or more additional rules. For example, the database 142 may be governed by a data deletion rule that causes the database 142 to automatically delete certain types of data that have been stored in the database 126 for longer than a threshold period of time. The database 126 may be automatically governed by any other types of rules as well.

In one or more embodiments, the multi-use sink 140 may provide bidirectional communications between the automated data broker system 108 and any of the downstream systems. For example, FIG. 1 shows the second downstream system 138 providing output data to the multi-use sink 140 that is then provided back to the automated data broker system 108 for processing. This data provided by the multi-use sink 140 may be processed by the automated data broker system 108 in a similar manner as the input data 102. In some instances, the data provided by the multi-use sink 140 may then also be accessible by any of the other downstream systems as well. However, some or all of the data provided by the multi-use sink 140 may also be restricted such that only certain (or no) downstream systems are able to access the data.

The database 126 may serve as an internal metadata store for the automated data broker system 108 (however, the database 126 may also be an external database). The database 126 may store any of the rules that may be used by the stream broker module 122 and/or any of the APIs used by the automated data broker system 108 to modify, filter, and/or otherwise transform any of the input data 102. For example, the database 126 may store keys that provide indications of user opt-out events. An opt-out event may be an indication provided by the user to a service that the user does not desire certain user data to be collected for that user. The database 126 may also store any other types of rules that may be used by the automated data broker system 108. The rules may indicate, for example, specific types of data that may need to be pseudonymized or fully anonymized, specific types of data that may need to be filtered out (e.g., not provided as an output of the automated data broker system 108), etc.

The automated data broker system 108 may also serve as a consistent data source for training machine learning models. Consistent data maximizes model performance by maintaining online and offline parity. The automated data broker system 108 ensures data consistency in terms of schema and acts as the authoritative source of customer data across online, streaming, and offline data. For example, machine learning models generated by advertisement systems may use online signals for inferencing and offline data (e.g., created from these same online signals) to train and validate the machine learning models. The advertisement systems may now calibrate machine learning model embeddings in real-time using customer interaction and/or purchase events from streaming channels that share the same data schema as data vended online and offline. The automated data broker system 108 with its unified broker architecture provides such consistent data across all channels.

Figure 2A:
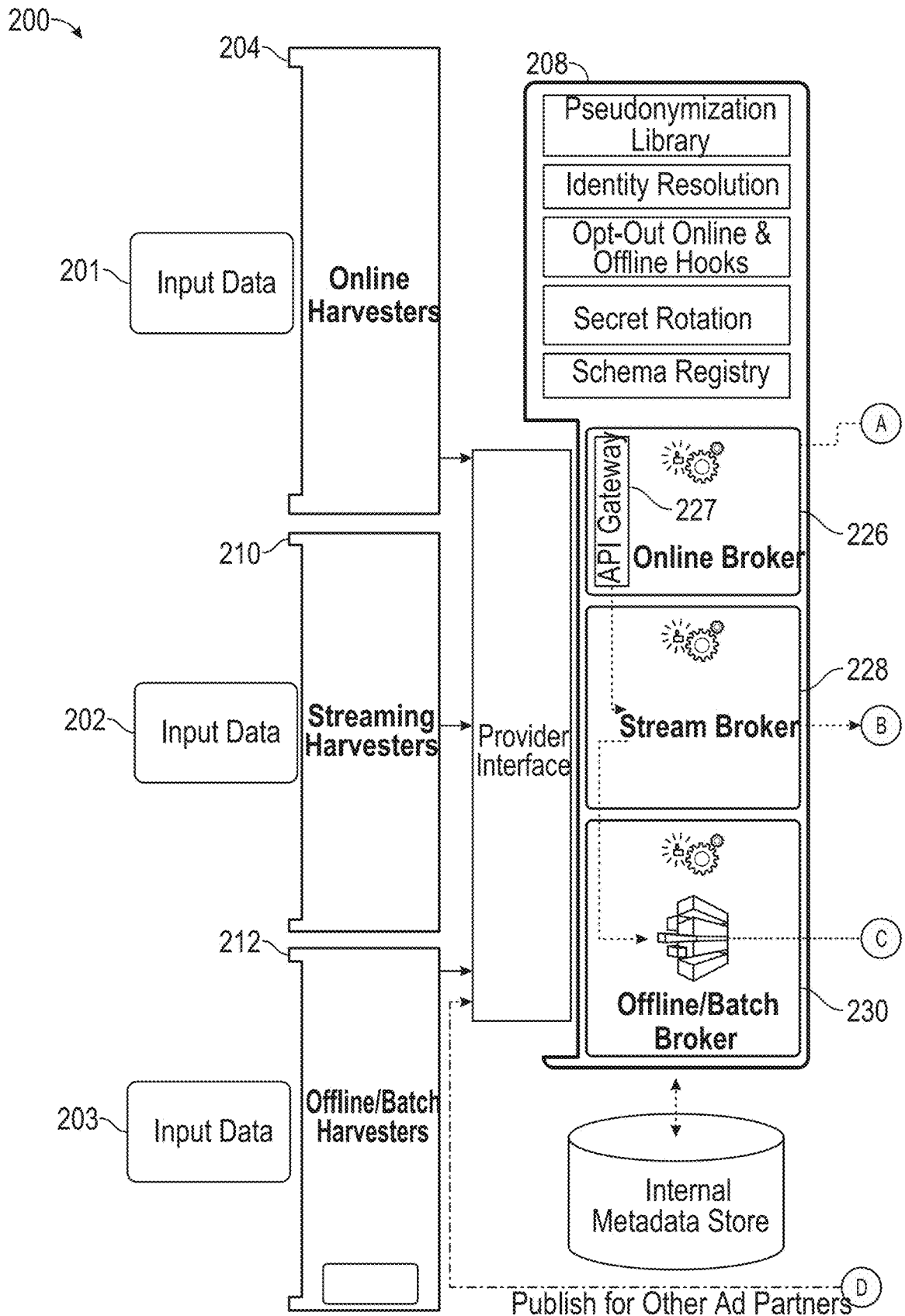
FIGS. 2A-2B illustrate another example system architecture in accordance with one or more example embodiments of the disclosure.
Figure 2B:
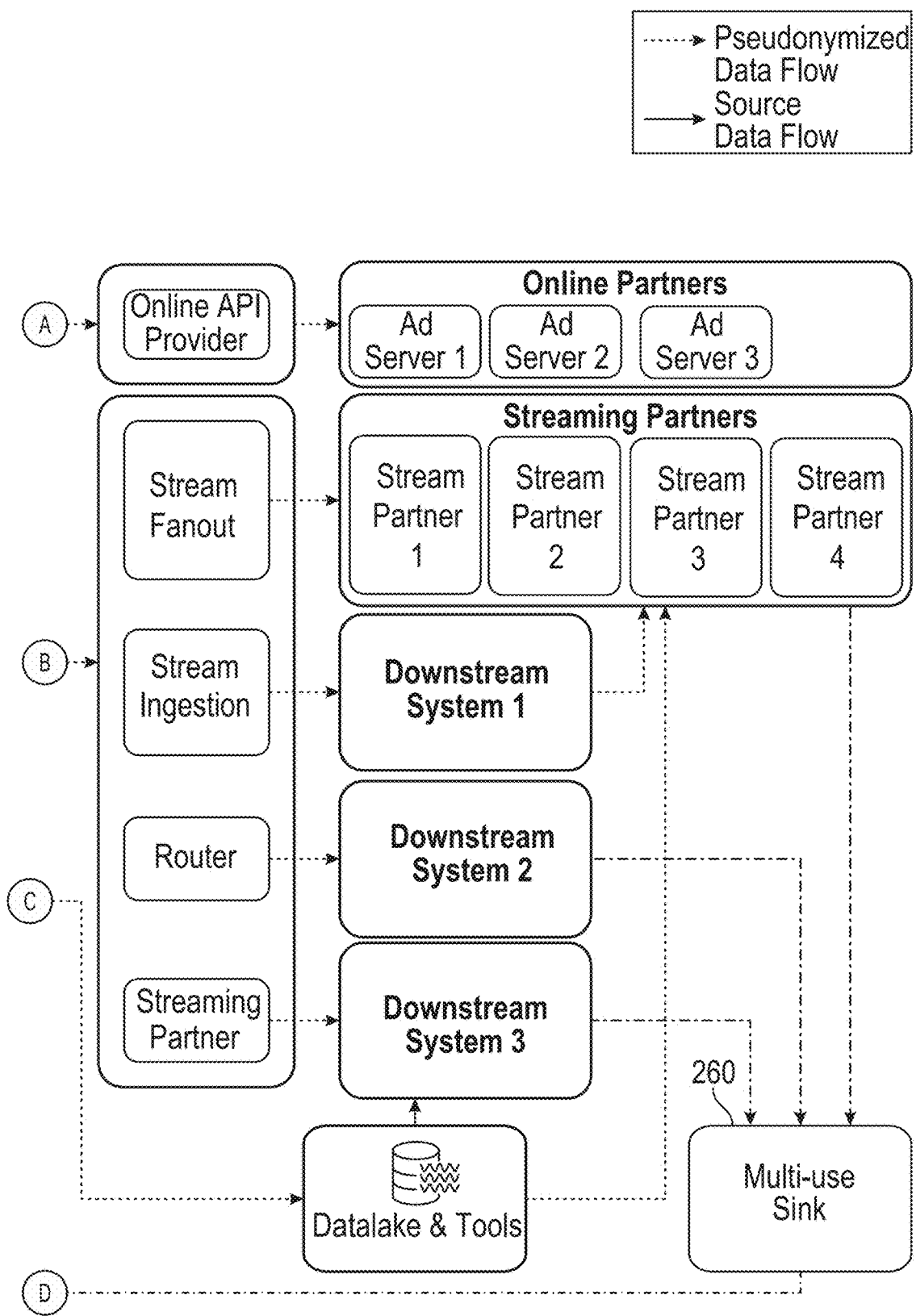

FIGS. 2A-2B illustrate an example system architecture 200 in accordance with one or more example embodiments of the disclosure.

The system architecture 200 of FIGS. 2A-2B may illustrate additional capabilities of the automated data broker system 208 (which may be the same as automated data broker system 108). First, the system architecture 200 illustrates that the automated data broker system 208 may be configured to receive input data (for example, input data 201, 202, and 203) in any number of different ways. For example, the system architecture 200 shows one or more online harvesters 204, streaming harvesters 210, and/or offline/batch harvesters 212. For example, the online harvesters 204 may be configured to receive input data 201 through API calls. The streaming harvesters 210 may be configured to receive input data 202 that is streamed in real-time. The offline/batch harvesters 212 may be configured to receive input data 203 in the form of micro-batches (for example, small files including activity spanning a particular amount of time) or large batches (for example, files including activity spanning a longer period of time).

Second, the system architecture 200 illustrates that the automated data broker system 208 may be configured to include an online broker 226 in addition to the stream broker 228 (similar to the stream broker 122) and the offline/batch broker 230 (similar to the offline/batch broker 124). The online broker 228 allows for rapid propagation of data through the automated data broker system 208 (for example, within milliseconds). This is possible because as data is processed, the online broker 226 performs direct downstream calls to a given consumer API. This allows for data to be immediately transmitted as the data is being processed. In contrast, the stream broker 228 takes data and adds the data into a stream, which adds inherent transmission delays. The different ways in which data may be received into the automated data broker system 208 (and/or any other automated data broker system described herein) and/or transmitted to a downstream system may be referred to as different "data transmission channels."

Figure 3A:
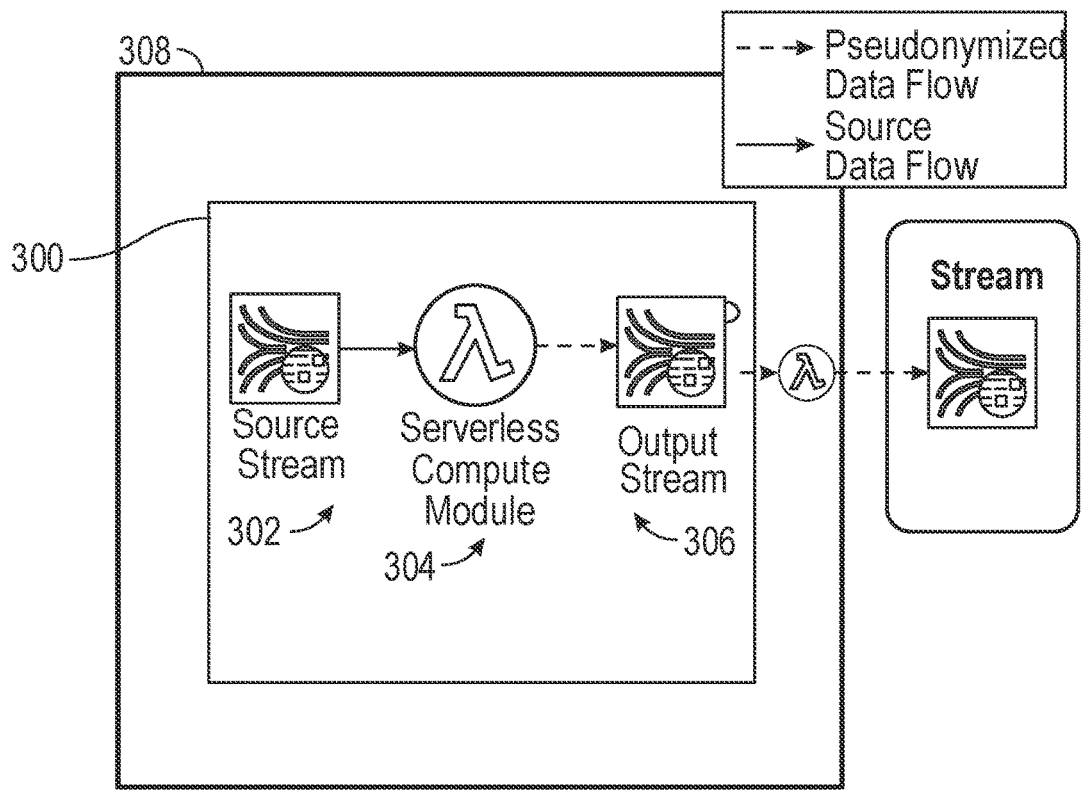
FIGS. 3A-3C illustrate example components of the stream broker module in accordance with one or more example embodiments of the disclosure.
Figure 3B:
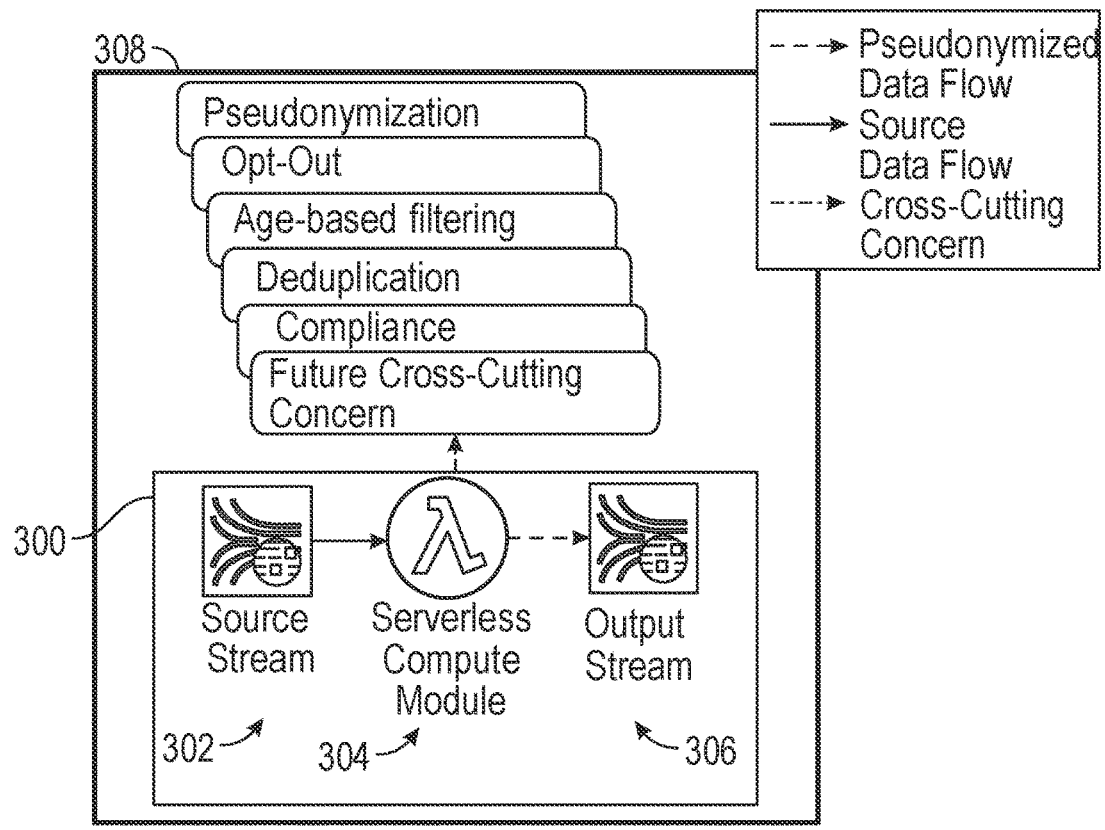
Figure 3C:
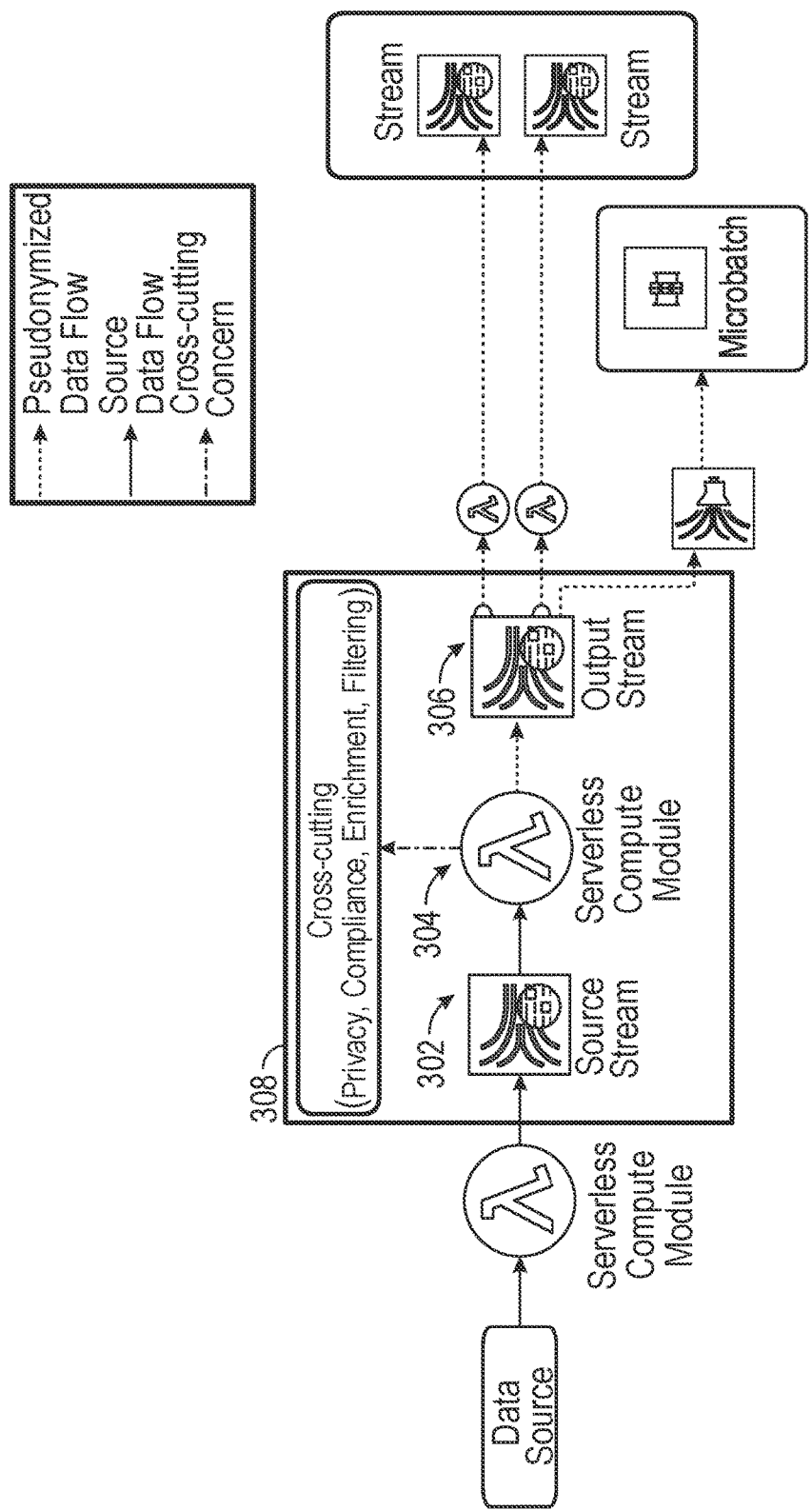

FIGS. 3A-3C illustrate example components of the stream broker module 300 in accordance with one or more example embodiments of the disclosure. The stream broker module 300 is shown as being included within an automated data broker system 308, which may be the same as, or similar to, any of the example automated data broker systems illustrated herein, such as automated data broker system 108, 208, 608, 814, 836, and/or any other automated data broker system described herein or otherwise.

Beginning with FIG. 3A, an embodiment of a stream broker module 300 is shown that includes one or more serverless data streaming services. For example, FIGS. 3A-3B show a source data streaming service 302 and an output data streaming service 306. The source data streaming service 302 may receive input data (for example, input data 102 and/or any other input data described herein) through the data harvester (for example, data harvester 104 and/or any other data harvester described herein). The output data streaming service 306 may stream any output data produced by the automated data broker system to any downstream systems and/or databases for storage and use. A cell-based architecture may be used such that a single streaming instance may have the responsibility to serve as the data broker for only one type of customer event.

To maintain uniformity of execution and provide maximum flexibility to the cross-cutting pre-processors, one or more serverless compute modules (for example, serverless compute module 304) may be used for nonmemory intensive functions to allow for easy scalability to handle high transactions per second (TPS). In one or more embodiments, and as described below with respect to FIG. 8, the stream broker module 300 may also include an event bridge, which may be provided in place of the output data streaming service 306.

In one or more embodiments, the automated data broker system 308 may use schema creation via code driven definitions to provide more effective control of the harvested data and flexibility of decoration via enrichment partners. The automated data broker system 308 may generate OpenAPI definitions from the code and allow consumer applications to automatically create stubs in various different languages. The automated data broker system 308 may also optionally provide hooks and allow consumer applications to ingest use case specific operations like filtering and transformation prior to delivery. Customer events may flow into a database for streaming joins and for the database to become data-at-rest for offline/batch processing.

FIG. 3B illustrates that the stream broker module 300 pre-processing pipelines may be responsible for consuming events from upstream harvesting components and performing applicable cross-cutting operations before allowing events to flow further downstream. There may be some standard cross-cutting operations that may be applied to all cells, such as pseudonymization, opt-out filtering, and other privacy and security related confirmatory actions. As an example, in the case of a video streaming platform cell, additional cross cutting concerns may include age-based account filtering, age-based profile filtering, and deduplication.

FIG. 3C illustrates that the automated data broker system 308 may be configured to provide output data to any downstream systems in various ways. For example, one option is to allow a streaming channel for which the automated data broker system 308 may create an enhanced fanout consumer to replicate its shards and support multiple downstream streaming consumers. A direct feed of the stream may be provided to a downstream system. Redbrick provides a second option to create a direct sink to a data bucket in the form of micro-batches.

Figure 4A:
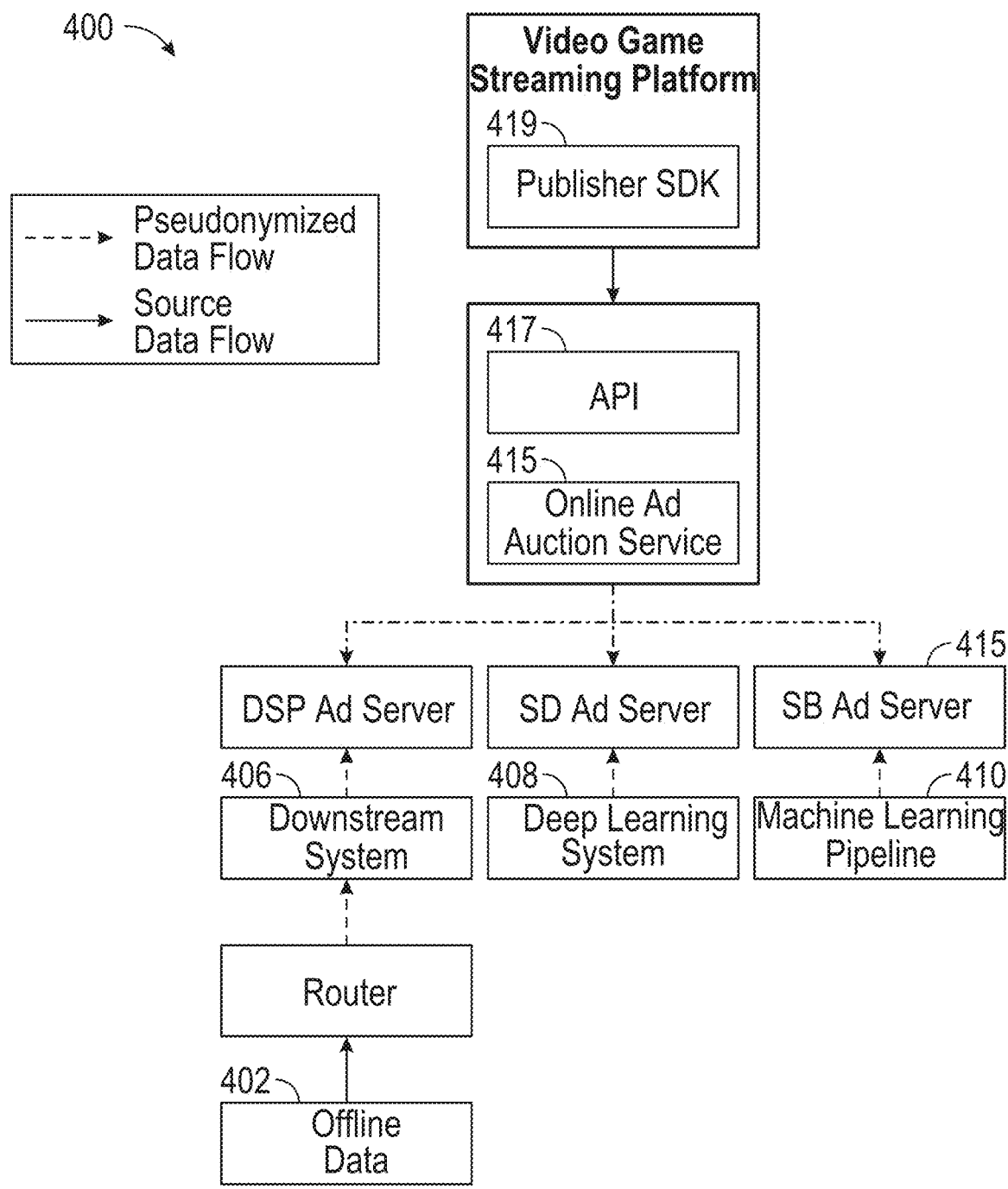
FIGS. 4A-4B illustrate an example system architecture associated with a video game streaming use case in accordance with one or more example embodiments of the disclosure.
Figure 4B:
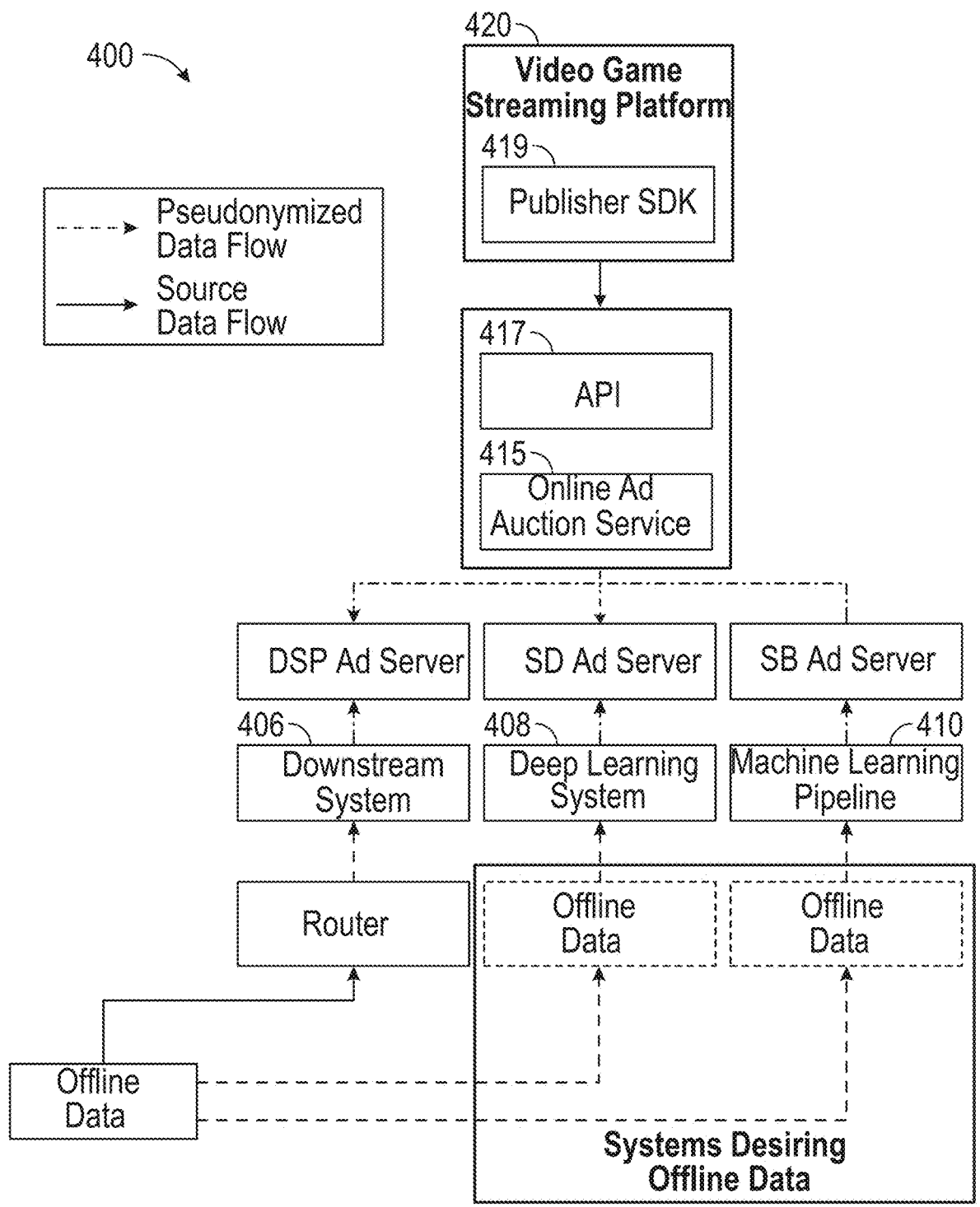

FIGS. 4A-4B illustrates an example system architecture 400 associated with a video game streaming use case in accordance with one or more example embodiments of the disclosure.

Beginning with FIG. 4A, a system architecture 400 is shown that illustrates a conventional state of data ingestion and use in advertisements for a video game streaming platform. FIG. 4A shows that a publisher software development kit (SDK) 419 may be integrated with the video game streaming platform 420. A web client may make a direct-to-buy (DTB) call to an API 417 with appropriate supply side context (for example, source ID, slot ID, and other publisher info). The API 417 may be associated with an online advertisement auction service 415 that may be configured to decorate additional placement related configurations and passes the bid-request to a big management system. The online advertisement auction service 415 reconciles bids between various demand programs and returns the winning bid to the publisher. FIG. 4A shows that only one downstream system 406 (for example, one of the downstream systems shown in FIGS. 1 and 2) has access to the datasets for the video game streaming platform.

One of the components that SD's DA Bidder relies on is a real-time deep learning system 408. The real-time deep learning system 408 may benefit from access to data containing minute-events and dimensions data to train its models. Similarly, sponsored brand videos may require video streaming platform datasets for a separate machine learning pipeline 410. FIG. 4B shows how both the real-time deep learning system 408 and the separate machine learning pipelines 410 request access to the datasets for the video streaming platform but may not have direct access to this data in this conventional architecture 400.

Figure 5:
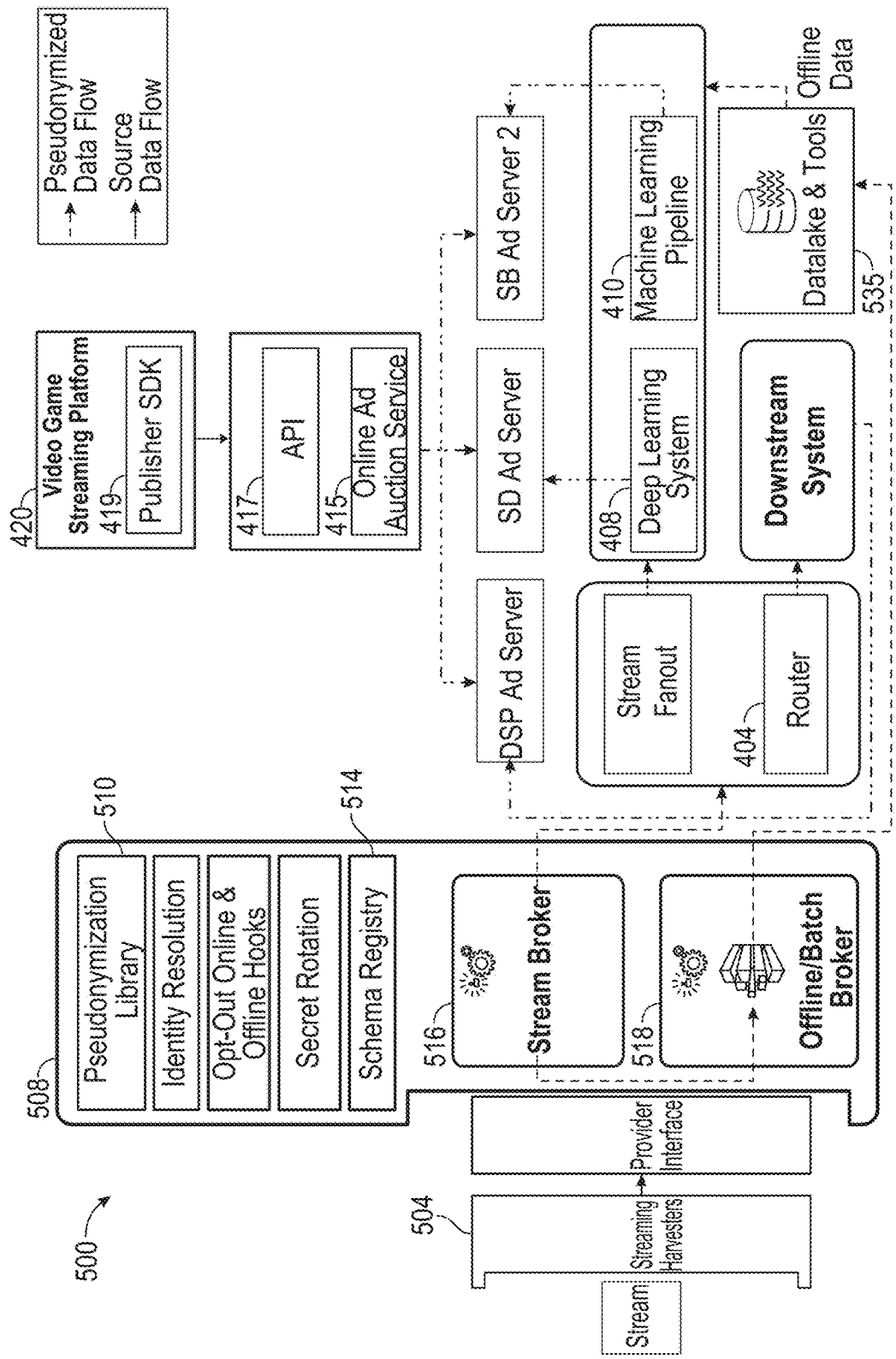
FIG. 5 illustrates another example system architecture associated with a video game streaming use case in accordance with one or more example embodiments of the disclosure.

FIG. 5 illustrates another example system architecture 500 associated with a video game streaming use case in accordance with one or more example embodiments of the disclosure. Particularly, the example system architecture 500 shown in FIG. 5 shows an implementation of the automated data broker system 508 (which may be the same as, or similar to, any other automated data broker system described herein) for the video game streaming use case illustrated in FIGS. 5A-5B.

The system architecture 500 may be similar to the system architecture 100 shown in FIG. 1. That is, the automated data broker system 508 may be similar to the automated data broker system 108. The various APIs, such as APIs 510-514 may be similar to the APIs shown in FIG. 1. The data harvester 504 may be similar to the data harvester 104 shown in FIG. 1. The stream broker module 516 and the offline/batch broker module 518 may be similar to the stream broker module 122 and the offline/batch broker module 124 shown in FIG. 1. Additionally, the database 535 may be similar to database 142 of FIG. 1. The input data in FIG. 5 is the user data specific to the video game streaming platform.

Using the automated data broker system 508, input data 502 from the video streaming platform may be obtained and shared via standardized channels across all various downstream systems (for example, various advertisement systems). As shown in FIG. 5, the existing bid-request integrations shown in FIGS. 4A-4B may continue to function in a similar manner; while the automated data broker system 508 creates a pipeline setup for video game streaming, platform streaming, and/or offline datasets. The automated data broker system 508 pseudonymizes PII data from the video game streaming platform and makes the data available in a compliant manner to all advertisement systems.

The system architecture 500 provides at least the following benefits. First, machine learning models that are trained for advertisement click-through prediction, relevance prediction, etc. may have access to consistent, schematized video game streaming platform event information along with associated context. Second, the system architecture 500 provides access to real-time data from the video game streaming platform, rather than offline logged datasets that have delays of up to 90 minutes (or any other period of time). Faster access to data unlocks new opportunities to target advertisements using in-session behavior. Third, the automated data broker system 508 automated the process storing the data in the database 535 and exposing the data catalog, lineage, quality metrics, etc., thereby allowing machine learning models to be trained in a matter of hours as opposed to days or weeks. Fourth, each advertisement system product may be decoupled to build models best suited to their needs without being limited by data access, data availability, or data delay constraints. Fifth, any user data compliance changes can be executed in one place (the automated data broker system 508), rather than having to execute such changes in multiple systems. Sixth, the automated data broker system 508 is extensible and can allow the addition of currently unavailable video game streaming platform events such as searches, browses, follows, etc. that can improve advertisement utilization.

Figure 6:
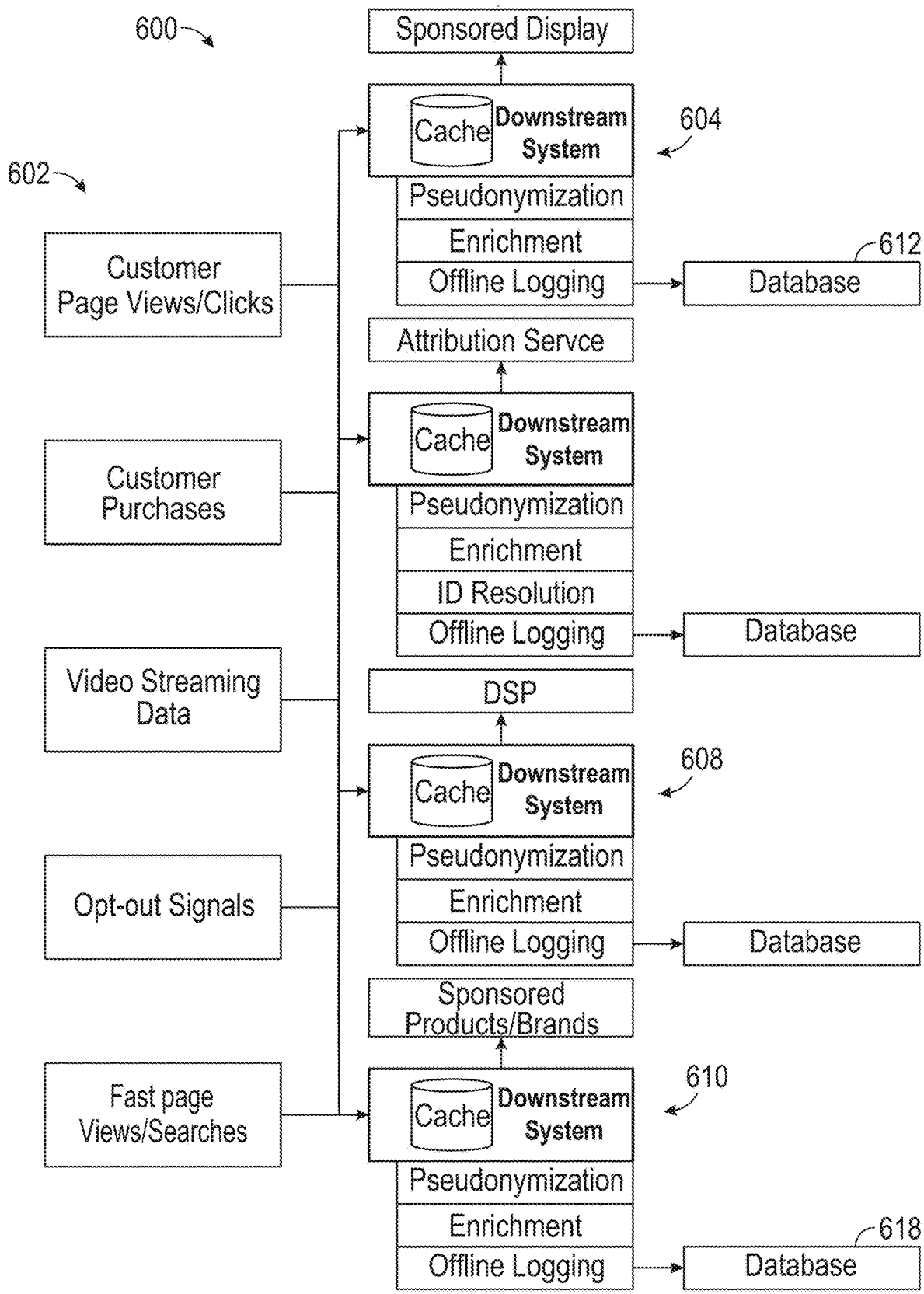
FIG. 6 illustrates another example system architecture in accordance with one or more example embodiments of the disclosure.

FIG. 6 illustrates another example system architecture 600 in accordance with one or more example embodiments of the disclosure. The system architecture 600 shown is a conventional system architecture that does not include the automated data broker system as described herein. The system architecture 600 shows that raw user data 602 is provided directly to the one or more downstream systems (for example, downstream systems 604-610). The one or more downstream systems may also be associated with one or more databases (for example, databases 612-618). These one or more downstream systems are then individually responsible for performing any of the data transformation functions. This may lead to inconsistencies in the way that the raw user data is transformed. Thus, the use of the automated data broker system described herein is advantageous at least because it provides a centralized upstream system for performing the data transformations before the data is provided to one or more downstream systems. This standardizes and automates the data transformation process to ensure that data received by the one or more downstream systems is already processed and ready for storage and use. This also mitigates or eliminates any inconsistencies in the way data is transformed.

Figure 7A:
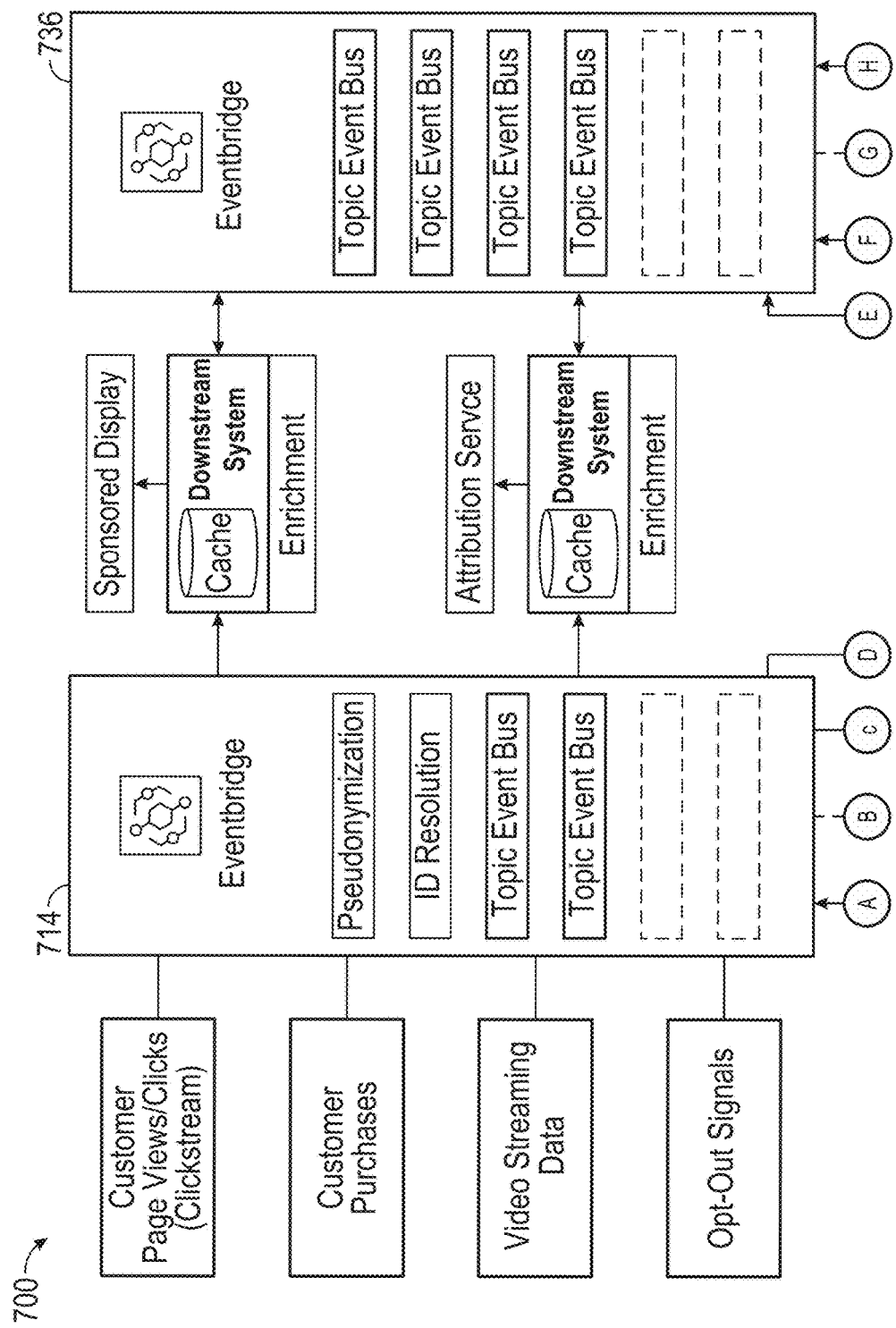
FIGS. 7A-7B illustrate another example system architecture in accordance with one or more example embodiments of the disclosure.
Figure 7B:
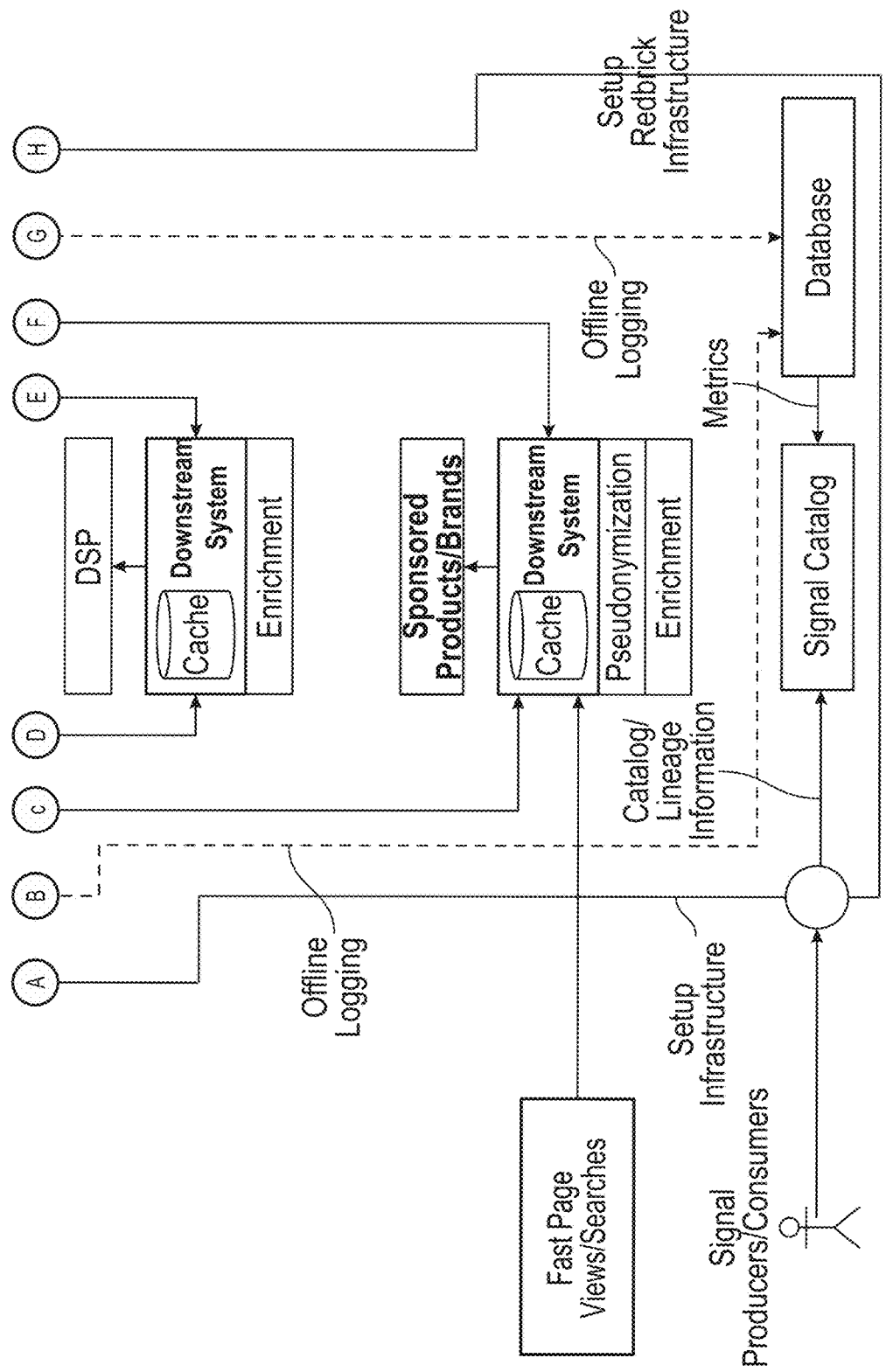

FIGS. 7A-7B illustrate another example system architecture 700 in accordance with one or more example embodiments of the disclosure.

Particularly, FIGS. 7A-7B show an illustration of the system architecture 600 of FIG. 6 that includes the addition of a first automated data broker system 714 and a second automated data broker system 736. As shown in FIGS. 7A-7B, the system architecture 700 is different than the system architectures 100 and 200 in that multiple automated data broker systems are used rather than one automated data broker system and a "multi-use sink" (for example, multi-use sink 140, multi-use sink 260, and/or any other multi-use sink described herein).

The first automated data broker system 714 and the second automated data broker system 736 may be similar systems. The first automated data broker system 714 may receive and process raw data inputs that are not pseudoanonymized (for example, similar to the data input 102 shown in FIG. 1). The second automated data broker system 736 receives and processes already-processed data to create differently decorated data. As an example, data provided to the second automated data broker system 736 may include a view of a detail product page associated with an online retail shopping platform. In initial decoration, an indication of a "browseladder" associated with the product (where the product is internalized within the catalog associated with the online retail shopping platform) may be added to the data. That is, a variation of the original input data record is produced. This allows one of the consumers associated with a given downstream system to publish derivation back into the second automated data broker system 736.

Another difference between the system architecture 700 and other system architectures described herein is the use of an event-driven architecture that employs topic event buses. An event-driven architecture uses events to trigger and communicate between decoupled services and is common in applications built with microservices. An event may refer to a change in state, or an update, such as an item being placed in a shopping cart on an online retail shopping platform. Events may either carry the state (e.g., the item purchased, the price, and a delivery address) or events may be identifiers (e.g., a notification that an order was shipped). Event-driven architectures have three key components: event producers, event routers, and event consumers. A producer publishes an event to the router, which filters and pushes the events to consumers. Producer services and consumer services are decoupled, which allows them to be scaled, updated, and deployed, independently. This allows for creation of topics with each topic representing a different data set.

Figure 8:
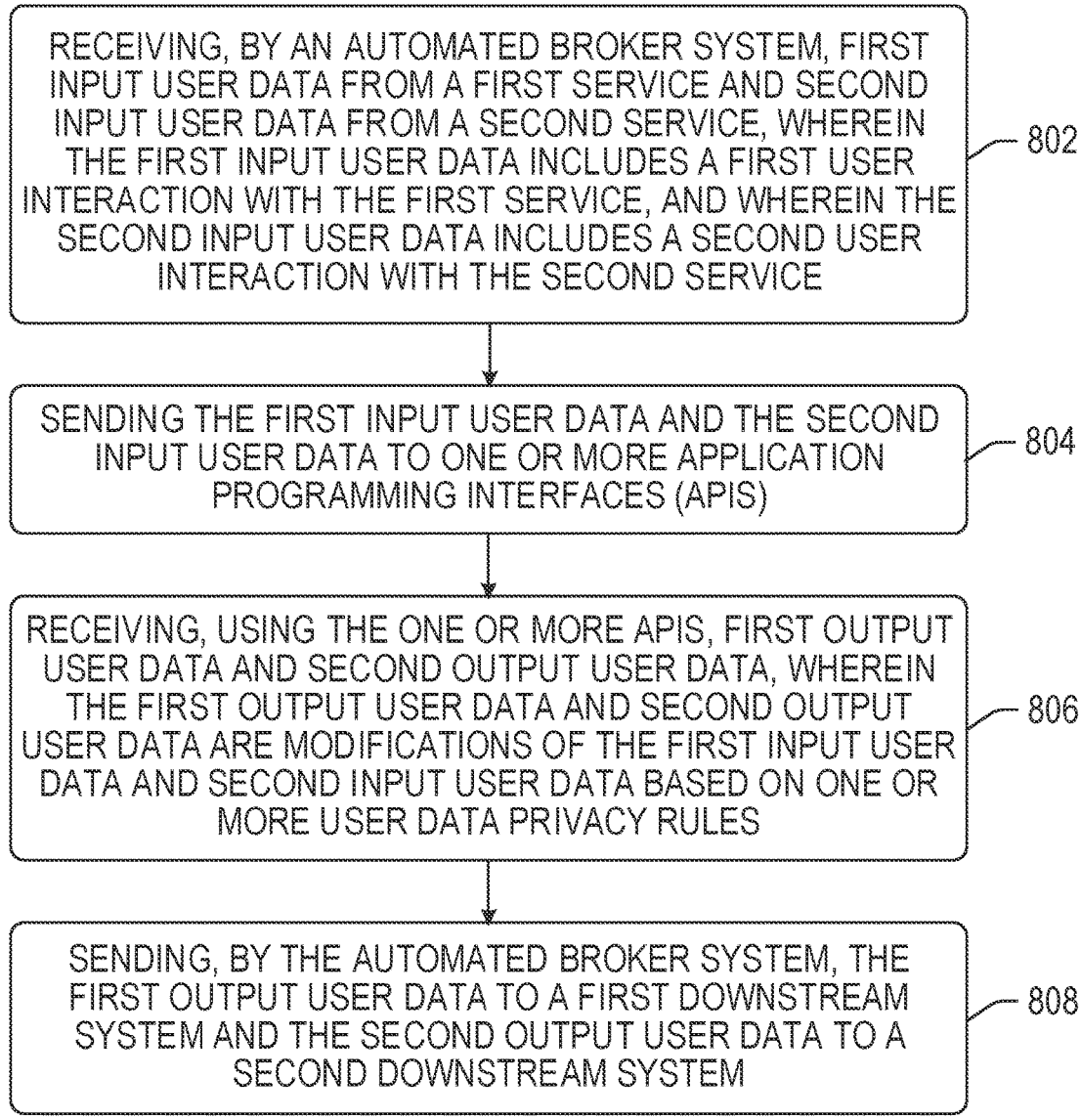
FIG. 8 illustrates an example method in accordance with one or more example embodiments of the disclosure.

FIG. 8 depicts an example method 800 in accordance with one or more example embodiments of the disclosure. The method 800 may be performed using computer-executable instructions stored on the memory of a device or system (for example, automated data broker system 108, automated data broker system 208, automated data broker system 608, computing device 900, any other data broker system described herein, and/or any other device or system described herein or otherwise).

At block 802 of the process flow 800, computer-executable instructions stored on the memory of a device or system may be executed to receive first input user data from a first service and second input user data from a second service, wherein the first input user data includes a first user interaction with the first service, and wherein the second input user data includes a second user interaction with the second service.

As nonlimiting examples, an automated data broker system may ingest user data from an online retail shopping platform, online grocery store purchases, online video streaming and video game streaming services, and/or any other types of services with which a user may interact. The input data may include any number of different types of user interactions with these different services. For example, with respect to an online retail shopping platform, examples of input data may include products viewed through the online retail shopping platform, products purchases, and/or any other types of user interactions. With respect to a video streaming platform, input data may include indications of videos viewed by a user, as well as information relating to the video, such as a genre, etc. These are merely nonlimiting examples of different types of services with which a user may interact and interactions that a user may perform with respect to the example services. These examples illustrate that the input data received by the automated data broker system may include any number of different types of data associated with any number of different services.

At block 804 of the process flow 800, computer-executable instructions stored on the memory of a device or system may be executed to send the first input user data and the second input user data to one or more application programming interfaces (APIs). Various examples of the different APIs that may be used are described in additional detail with respect to FIG. 1. For example, the APIs may be used to perform pseudonymization of the input data, filter input data relating to users who have indicated a desire to "opt-out" of data collection, and/or any other types of modifications, filtering, and/or transformations of the input data.

At block 806 of the process flow 800, computer-executable instructions stored on the memory of a device or system may be executed to receive, using the one or more APIs, first output user data and second output user data, wherein the first output user data and second output user data are modifications of the first input user data and second input user data based on one or more user data privacy rules.

At block 808 of the process flow 800, computer-executable instructions stored on the memory of a device or system may be executed to send the first output user data to a first downstream system and the second output user data to a second downstream system. For example, the first output data and second output data may be standardized data that is modified, filtered, and/or otherwise transformed to be in compliance with various rules governing user data as described herein. Thus, the automated data broker system serves as an automated intermediary system that ensures that all data that is provided to a system for use (for example, for use in advertising or any other purposes) is suitable for such use based on the relevant rules. The first output user data and the second output user data may also be sent to a database for storage and future use as well.

One or more operations of the methods, process flows, or use cases of FIGS. 1-8 may have been described above as being performed by a user device, or more specifically, by one or more program module(s), applications, or the like executing on a device. It should be appreciated, however, that any of the operations of the methods, process flows, or use cases of FIGS. 1-8 may be performed, at least in part, in a distributed manner by one or more other devices, or more specifically, by one or more program module(s), applications, or the like executing on such devices. In addition, it should be appreciated that the processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-8 may be described in the context of the illustrative devices, it should be appreciated that such operations may be implemented in connection with numerous other device configurations.

The operations described and depicted in the illustrative methods, process flows, and use cases of FIGS. 1-8 may be carried out or performed in any suitable order as desired in various example embodiments of the disclosure. Additionally, in certain example embodiments, at least a portion of the operations may be carried out in parallel. Furthermore, in certain example embodiments, fewer, more, or different operations than those depicted in FIGS. 1-8 may be performed.

Figure 9:
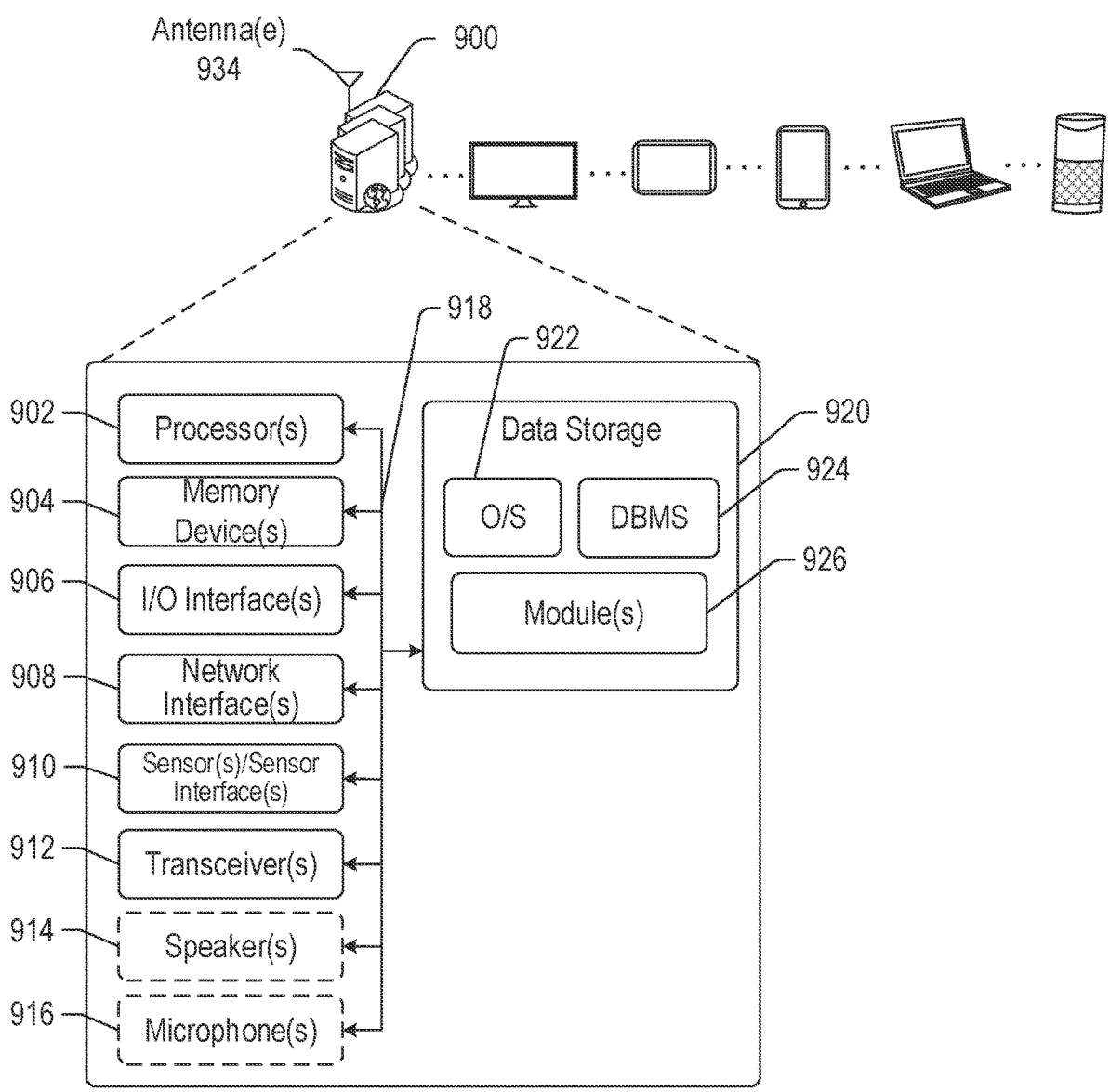
FIG. 9 is a block diagram of an illustrative computing device in accordance with one or more example embodiments of the disclosure.

FIG. 9 is a schematic block diagram of an illustrative computing device 900 in accordance with one or more example embodiments of the disclosure. The computing device 900 may include any suitable computing device capable of receiving and/or generating data including, but not limited to, a mobile device, such as a smartphone, tablet, e-reader, wearable device, or the like; a desktop computer; a laptop computer; a content streaming device; a set-top box; or the like. The computing device 900 may correspond to an illustrative device configuration for the devices of FIGS. 1-9.

The computing device 900 may represent components that may be included in any of the systems, devices, etc. described herein. For example, any of the automated data broker systems 108, 208, 308, 508, 714, 736, etc.

The computing device 900 may be configured to communicate via one or more networks with one or more servers, search engines, user devices, or the like. In some embodiments, a single remote server or a single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 900 may include one or more processor(s) 902, one or more memory devices 904 (generically referred to herein as memory 904), one or more input/output (I/O) interface(s) 906, one or more network interface(s) 908, one or more sensors or sensor interface(s) 910, one or more transceivers 912, one or more optional speakers 914, one or more optional microphones 916, and data storage 920. The computing device 900 may further include one or more buses 918 that functionally couple various components of the computing device 900. The computing device 900 may further include one or more antenna(e) 934 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 918 may include at least one of a system bus, the memory bus, an address bus, or a message bus, and may permit exchange of information (e.g., data (including computer-executable code), signaling, etc.) between various components of the computing device 900. The bus(es) 918 may include, without limitation, the memory bus or the memory controller, a peripheral bus, an accelerated graphics port, and so forth. The bus(es) 918 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 904 of the computing device 900 may include volatile memory (memory that maintains its state when supplied with power) such as random-access memory (RAM) and/or nonvolatile memory (memory that maintains its state even when not supplied with power) such as read-only memory (ROM), flash memory, ferroelectric RAM (FRAM), and so forth. Persistent data storage, as that term is used herein, may include nonvolatile memory. In certain example embodiments, volatile memory may enable faster read/write access than non-volatile memory. However, in certain other example embodiments, certain types of nonvolatile memory (e.g., FRAM) may enable faster read/write access than certain types of volatile memory.

In various implementations, the memory 904 may include multiple different types of memory such as various types of static random-access memory (SRAM), various types of dynamic random-access memory (DRAM), various types of unalterable ROM, and/or writeable variants of ROM, such as, electrically erasable programmable read-only memory (EEPROM), flash memory, and so forth. The memory 904 may include main memory as well as various forms of cache memory such as instruction cache(s), data cache(s), translation lookaside buffer(s) (TLBs), and so forth. Further, cache memory such as a data cache may be a multilevel cache organized as a hierarchy of one or more cache levels (L1, L2, etc.).

The data storage 920 may include removable storage and/or non-removable storage including, but not limited to, magnetic storage, optical disk storage, and/or tape storage. The data storage 920 may provide non-volatile storage of computer-executable instructions and other data. The memory 904 and the data storage 920, removable and/or non-removable, are examples of computer-readable storage media (CRSM) as that term is used herein.

The data storage 920 may store computer-executable code, instructions, or the like that may be loadable into the memory 904 and executable by the processor(s) 902 to cause the processor(s) 902 to perform or initiate various operations. The data storage 920 may additionally store data that may be copied to memory 904 for use by the processor(s) 902 during the execution of the computer-executable instructions. Moreover, output data generated as a result of execution of the computer-executable instructions by the processor(s) 902 may be stored initially in memory 904 and ultimately may be copied to data storage 920 for nonvolatile storage.

More specifically, the data storage 920 may store one or more operating systems (O/S) 922; one or more database management systems (DBMS) 924; and one or more program module(s), applications, engines, computer-executable code, scripts, or the like, such as, for example, one or more module(s) 926, one or more communication module(s) 928, one or more content scanning module(s) 930, and/or one or more prediction module(s) 932. Some or all of these module(s) may be sub-module(s). Any of the components depicted as being stored in data storage 920 may include any combination of software, firmware, and/or hardware. The software and/or firmware may include computer-executable code, instructions, or the like that may be loaded into the memory 904 for execution by one or more of the processor(s) 902. Any of the components depicted as being stored in data storage 920 may support the functionality described in reference to correspondingly named components earlier in this disclosure.

The data storage 920 may further store various types of data utilized by components of the computing device 900. Any data stored in the data storage 920 may be loaded into the memory 904 for use by the processor(s) 902 in executing computer-executable code. In addition, any data depicted as being stored in the data storage 920 potentially may be stored in one or more datastore(s) and may be accessed via the DBMS 924 and loaded in the memory 904 for use by the processor(s) 902 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 9, the datastore(s) may include, for example, purchase history information, user action information, user profile information, a database linking search queries and user actions, and other information.

The processor(s) 902 may be configured to access the memory 904 and execute computer-executable instructions loaded therein. For example, the processor(s) 902 may be configured to execute computer-executable instructions of the various program module(s), applications, engines, or the like of the computing device 900 to cause or facilitate various operations to be performed in accordance with one or more embodiments of the disclosure. The processor(s) 902 may include any suitable processing unit capable of accepting data as input, processing the input data in accordance with stored computer-executable instructions, and generating output data. The processor(s) 902 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 902 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 902 may be capable of supporting any of a variety of instruction sets.

Referring now to functionality supported by the various program module(s) depicted in FIG. 9, the module(s) 926 may include computer-executable instructions, code, or the like that responsive to execution by one or more of the processor(s) 902 may perform functions including, but not limited to, performing any functionality associated the automated data broker system.

Referring now to other illustrative components depicted as being stored in the data storage 920, the O/S 922 may be loaded from the data storage 920 into the memory 904 and may provide an interface between other application software executing on the computing device 900 and the hardware resources of the computing device 900. More specifically, the O/S 922 may include a set of computer-executable instructions for managing the hardware resources of the computing device 900 and for providing common services to other application programs (e.g., managing memory allocation among various application programs). In certain example embodiments, the O/S 922 may control execution of the other program module(s) to dynamically enhance characters for content rendering. The O/S 922 may include any operating system now known or which may be developed in the future including, but not limited to, any server operating system, any mainframe operating system, or any other proprietary or non-proprietary operating system.

The DBMS 924 may be loaded into the memory 904 and may support functionality for accessing, retrieving, storing, and/or manipulating data stored in the memory 904 and/or data stored in the data storage 920. The DBMS 924 may use any of a variety of database models (e.g., relational model, object model, etc.) and may support any of a variety of query languages. The DBMS 924 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 900 is a mobile device, the DBMS 924 may be any suitable lightweight DBMS optimized for performance on a mobile device.

Referring now to other illustrative components of the computing device 900, the input/output (I/O) interface(s) 906 may facilitate the receipt of input information by the computing device 900 from one or more I/O devices as well as the output of information from the computing device 900 to the one or more I/O devices. The I/O devices may include any of a variety of components, such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 900 or may be separate. The I/O devices may further include, for example, any number of peripheral devices such as data storage devices, printing devices, and so forth.

The I/O interface(s) 906 may also include an interface for an external peripheral device connection such as universal serial bus (USB), FireWire, Thunderbolt, Ethernet port, or other connection protocol that may connect to one or more networks. The I/O interface(s) 906 may also include a connection to one or more of the antenna(e) 934 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 900 may further include one or more network interface(s) 908 via which the computing device 900 may communicate with any of a variety of other systems, platforms, networks, devices, and so forth. The network interface(s) 908 may enable communication, for example, with one or more wireless routers, one or more host servers, one or more web servers, and the like via one or more of networks.

The antenna(e) 934 may include any suitable type of antenna depending, for example, on the communications protocols used to transmit or receive signals via the antenna (e) 934. Nonlimiting examples of suitable antennas may include directional antennas, non-directional antennas, dipole antennas, folded dipole antennas, patch antennas, multiple-input multiple-output (MIMO) antennas, or the like. The antenna(e) 934 may be communicatively coupled to one or more transceivers 912 or radio components to which or from which signals may be transmitted or received.

As previously described, the antenna(e) 934 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 934 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 934 may be configured to transmit or receive radio frequency signals within any suitable frequency range forming part of the unlicensed portion of the radio spectrum.

The antenna(e) 934 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 912 may include any suitable radio component(s) for—in cooperation with the antenna(e) 934—transmitting or receiving radio frequency (RF) signals in the bandwidth and/or channels corresponding to the communications protocols utilized by the computing device 900 to communicate with other devices. The transceiver(s) 912 may include hardware, software, and/or firmware for modulating, transmitting, or receiving—potentially in cooperation with any of antenna(e) 934—communications signals according to any of the communications protocols discussed above including, but not limited to, one or more Wi-Fi and/or Wi-Fi direct protocols, as standardized by the IEEE 802.9 standards, one or more non-Wi-Fi protocols, or one or more cellular communications protocols or standards. The transceiver(s) 912 may further include hardware, firmware, or software for receiving GNSS signals. The transceiver(s) 912 may include any known receiver and baseband suitable for communicating via the communications protocols utilized by the computing device 900. The transceiver(s) 912 may further include a low noise amplifier (LNA), additional signal amplifiers, an analog-to-digital (A/D) converter, one or more buffers, a digital baseband, or the like.

The sensor(s)/sensor interface(s) 910 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 914 may be any device configured to generate audible sound. The optional microphone(s) 916 may be any device configured to receive analog sound input or voice data.

It should be appreciated that the program module(s), applications, computer-executable instructions, code, or the like depicted in FIG. 9 as being stored in the data storage 920 are merely illustrative and not exhaustive and that processing described as being supported by any particular module alternatively may be distributed across multiple module(s) or performed by a different module. In addition, various program module(s), script(s), plug-in(s), Application Programming Interface(s) (API(s)), or any other suitable computer-executable code hosted locally on the computing device 900, and/or hosted on other computing device(s) accessible via one or more networks, may be provided to support functionality provided by the program module(s), applications, or computer-executable code depicted in FIG. 9 and/or additional or alternate functionality. Further, functionality may be modularized differently such that processing described as being supported collectively by the collection of program module(s) depicted in FIG. 9 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionalities described as being supported by any of the program module(s) depicted in FIG. 9 may be implemented, at least partially, in hardware and/or firmware across any number of devices.

It should further be appreciated that the computing device 900 may include alternate and/or additional hardware, software, or firmware components beyond those described or depicted without departing from the scope of the disclosure. More particularly, it should be appreciated that software, firmware, or hardware components depicted as forming part of the computing device 900 are merely illustrative and that some components may not be present or additional components may be provided in various embodiments. While various illustrative program module(s) have been depicted and described as software module(s) stored in data storage 920, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language, such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium that can be used to store the information and can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
   memory that stores computer-executable instructions; and
   one or more processors configured to access the memory and execute the computer-executable instructions to:
   receive first input user data from a first service and second input user data from a second service, wherein the first input user data includes a first user interaction with the first service, and wherein the second input user data includes a second user interaction with the second service;
   send the first input user data and the second input user data to a plurality of application programming interfaces (APIs), wherein a first API of the plurality of APIs is configured to encrypt, using a salt, the first input user data or the second input user data, wherein a second API of the plurality of APIs is configured to periodically modify the salt, wherein a third API of the plurality of APIs is configured to map an identity of a user in the first service to an identity of the user in the second service, a fourth API configured to determine that a user has opted-out of some or all data collection, a fifth API configured to provide a schema to the first input user data or the second input user data, and a sixth API configured to enrich, filter, and deduplicate the first input user data or the second input user data;
   receive, using the plurality of APIs, first output user data and second output user data, wherein the first output user data and second output user data are based on the first input user data and second input user data and are anonymized and filtered based on one or more user data privacy rules; and
   send the first output user data to a first downstream system and the second output user data to a second downstream system.

2. The system of claim 1, wherein send the first output user data to the first downstream system and the second output user data to the second downstream system further comprises:
   send the first output user data to the first downstream system over a first output data transmission channel, wherein the first output data transmission channel involves sending the first output user data directly through an API associated with the first downstream system; and
   send the second output user data to the second downstream system over a second output data transmission channel, wherein the second output data transmission channel involves sending second output user data over a data stream.

3. The system of claim 2, wherein the one or more processors are further configured to execute the computer-executable instructions to:
   send third output user data to a database over a third output data transmission channel that is different than the first output data transmission channel and the second output data transmission channel.

4. The system of claim 1, wherein receive the first input user data and the second input user data to the second downstream system further comprises:
   receive the first input user data over a first input data transmission channel, wherein the first input data transmission channel involves receiving the first input user data directly through an API; and
   receive the second input user data over a second input data transmission channel, wherein the second input data transmission channel involves receiving the second input user data over a data stream.

5. A system comprising:
   memory that stores computer-executable instructions; and
   one or more processors configured to access the memory and execute the computer-executable instructions to:
   receive first input user data from a first service and second input user data from a second service, wherein the first input user data includes a first user interaction with the first service, and wherein the second input user data includes a second user interaction with the second service;
   send the first input user data and the second input user data to a plurality of application programming interfaces (APIs);
   receive, using the plurality of APIs, first output user data and second output user data, wherein the first output user data and second output user data are modifications of the first input user data and second input user data based on one or more user data privacy rules,
   wherein the first output user data or the second output user data includes the first input user data or the second input user data that is partially or fully anonymized, wherein a first API of the plurality of APIs is used to encrypt the first input user data or the second input user data, and wherein a second API of the plurality of APIs uses a salt to encrypt a key used to encrypt the first input user data or the second input user data,
   wherein the plurality of APIs further comprises at least one of: a third API map an identity of a user in the first service to an identity of the user in the second service, a fourth API configured to determine that a user has opted-out of some or all data collection, a fifth API configured to provide a schema to the first input user data or the second input user data, and a sixth API configured to enrich, filter, and deduplicate the first input user data or the second input user data; and send the first output user data to a first downstream system and the second output user data to a second downstream system.

6. The system of claim 5, wherein the one or more processors are further configured to execute the computer-executable instructions to:

receive, from a first database, an indication of an opt-out provided by a user associated with the first input user data, wherein the first output user data includes less user data than the first input user data, wherein the first input user data is filtered using the third API of the plurality of APIs based on the indication of the opt-out.

7. The system of claim 5, wherein send the first output user data to the first downstream system and the second output user data to the second downstream system further comprises:

send the first output user data to the first downstream system over a first output data transmission channel, wherein the first output data transmission channel involves sending the first output user data directly through an API associated with the first downstream system; and send the second output user data to the second downstream system over a second output data transmission channel, wherein the second output data transmission channel involves sending second output user data over a data stream.

8. The system of claim 5, wherein receive the first input user data and the second input user data to the second downstream system further comprises:

receive the first input user data over a first input data transmission channel, wherein the first input data transmission channel involves receiving the first input user data directly through an API; and receive the second input user data over a second input data transmission channel, wherein the second input data transmission channel involves receiving the second input user data over a data stream.

9. The system of claim 7, wherein the one or more processors are further configured to execute the computer-executable instructions to:

send third output user data to a database over a third output data transmission channel that is different than the first output data transmission channel and the second output data transmission channel.

10. The system of claim 5, wherein the one or more processors are further configured to execute the computer-executable instructions to:

receive third input data that is output by the first downstream system.

11. A method comprising receiving, by an automated broker system, first input user data from a first service and second input user data from a second service, wherein the first input user data includes a first user interaction with the first service, and wherein the second input user data includes a second user interaction with the second service;

sending the first input user data and the second input user data to a plurality of application programming interfaces (APIs);

receiving, using the plurality of APIs, first output user data and second output user data, wherein the first output user data and second output user data are modifications of the first input user data and second input user data based on one or more user data privacy rules, wherein the first output user data or the second output user data includes the first input user data or the second input user data that is partially or fully anonymized, wherein a first API of the plurality of APIs is used to encrypt the first input user data or the second input user data, and wherein a second API of the plurality of APIs uses a salt to encrypt a key used to encrypt the first input user data or the second input user data, wherein the plurality of APIs further comprises at least one of: a third API map an identity of a user in the first service to an identity of the user in the second service, a fourth API configured to determine that a user has opted-out of some or all data collection, a fifth API configured to provide a schema to the first input user data or the second input user data, and a sixth API configured to enrich, filter, and deduplicate the first input user data or the second input user data; and sending, by the automated broker system, the first output user data to a first downstream system and the second output user data to a second downstream system.

12. The method of claim 11, further comprising:

receiving, from a first database and by the automated broker system, an indication of an opt-out provided by a user associated with the first input user data, wherein the first output user data includes less user data than the first input user data, wherein the first input user data is filtered using the third API of the plurality of APIs based on the indication of the opt-out.

13. The method of claim 11, wherein send the first output user data to the first downstream system and the second output user data to the second downstream system further comprises:

sending, by the automated broker system, the first output user data to the first downstream system over a first output data transmission channel, wherein the first output data transmission channel involves sending the first output user data directly through an API associated with the first downstream system; and send, by the automated broker system, the second output user data to the second downstream system over a second output data transmission channel, wherein the second output data transmission channel involves sending second output user data over a data stream.

14. The method of claim 13, further comprising:

sending, by the automated broker system, third output user data to a database over a third output data transmission channel that is different than the first output data transmission channel and the second output data transmission channel.

15. The method of claim 11, wherein receiving the first input user data and the second input user data to the second downstream system further comprises:

receiving, by the automated broker system, the first input user data over a first input data transmission channel, wherein the first input data transmission channel involves receiving the first input user data directly through an API; and receiving, by the automated broker system, the second input user data over a second input data transmission channel, wherein the second input data transmission channel involves receiving the second input user data over a data stream.

16. The method of claim 11, further comprising:
receiving, by the automated broker system, third input data that is output by the first downstream system.

* * * * *